US010395304B2

(12) United States Patent
Robb et al.

(10) Patent No.: US 10,395,304 B2
(45) Date of Patent: Aug. 27, 2019

(54) SYSTEM AND METHOD FOR DISTRIBUTING MULTIMEDIA CONTENT

(71) Applicant: David K Robb, Charlotte, NC (US)

(72) Inventors: David Robb, Charlotte, NC (US); Grant Neerings, Charlotte, NC (US); Cameron Patterson, Seattle, WA (US); Joseph Rodriguez, Seattle, WA (US); Quinton Richard Harris, Seattle, WA (US); Benjamin Cook, Seattle, WA (US)

(73) Assignee: DKR CONSULTING LLC, Charlotte, NC (US)

( * ) Notice: Subject to any disclaimer, the term of this patent is extended or adjusted under 35 U.S.C. 154(b) by 57 days.

(21) Appl. No.: 15/591,208

(22) Filed: May 10, 2017

(65) Prior Publication Data
US 2017/0243280 A1    Aug. 24, 2017

Related U.S. Application Data

(63) Continuation of application No. 13/571,293, filed on Aug. 9, 2012, now Pat. No. 9,679,298, which is a continuation-in-part of application No. 12/852,090, filed on Aug. 6, 2010, now abandoned.

(51) Int. Cl.
| | |
|---|---|
| *G06Q 30/00* | (2012.01) |
| *G06Q 30/06* | (2012.01) |
| *G06Q 30/02* | (2012.01) |
| *G06Q 50/00* | (2012.01) |
| *G06F 3/0481* | (2013.01) |
| *G06F 3/0484* | (2013.01) |

(52) U.S. Cl.
CPC ..... *G06Q 30/0641* (2013.01); *G06F 3/04817* (2013.01); *G06F 3/04842* (2013.01); *G06Q 30/02* (2013.01); *G06Q 30/0643* (2013.01); *G06Q 50/01* (2013.01)

(58) Field of Classification Search
CPC .................................................. G06Q 30/06–08
USPC ................................................ 705/26.1–27.2
See application file for complete search history.

(56) References Cited

U.S. PATENT DOCUMENTS

| | | | | |
|---|---|---|---|---|
| 7,526,545 | B2* | 4/2009 | Jerome | G06Q 30/02 709/224 |
| 2010/0235766 | A1* | 9/2010 | Fujioka | G06Q 10/101 715/762 |
| 2012/0295697 | A1* | 11/2012 | Anderson | G07F 17/32 463/25 |

* cited by examiner

*Primary Examiner* — Ethan D Civan

(57) ABSTRACT

A portable web widget for distribution of multimedia content over a computer communications network, the web widget adapted for viral distribution and execution in a web browser on a client device wherein the widget includes a content retrieval component communicatively coupled to an application server over the computer communications network, the content retrieval component configured to retrieve one or more multimedia display files and metadata into an embedded electronic commerce store in the web widget after it enters an active operational mode, the widget also including a content preview component configured to enable a streamed execution of a portion of the multimedia content files associated with each of the multimedia display files from a multimedia content distribution system executing on the application server, and a transaction processing component operative to execute and complete a commercial transaction in the embedded electronic commerce store pertaining to the multimedia content files.

13 Claims, 16 Drawing Sheets

SYSTEM AND METHOD FOR DISTRIBUTING MULTIMEDIA CONTENT

CROSS-REFERENCE TO RELATED APPLICATION

This application is a Continuation of U.S. patent application Ser. No. 13/571,293, filed Aug. 9, 2012, which is a Continuation-In-Part of U.S. patent application Ser. No. 12/852,090, filed Aug. 6, 2010, which are hereby incorporated by reference in their entirety.

FIELD

The present disclosure relates generally to the field of electronic commerce, and in particular but not exclusively, relates to a system and method for the distribution of multimedia content and the consummation of transactions between content owners, content distributors and consumers.

BACKGROUND

Electronic commerce on the Internet has become commonplace. There are many merchants offering goods and services via web sites on the Internet, and an increasing number of consumers purchase goods and services on various Internet websites. In many cases, the electronic commerce transactions involve electronic content and physical goods. For example, many consumers purchase items such as books, compact disks (CDs) and digital video disks (DVDs) via the Internet. Increasingly, however, consumers are using the Internet to purchase electronic content such as information products, music or to gain access to web sites that provide news or entertainment stories.

More recently, the Internet is being used to engage in a wide variety of social networking between and among different individuals and online communities. When used by businesses to promote their goods and services to such individuals and online communities, this form of networking is called "social media marketing." In many of these online social relationships, users share and identify recommended content for use and consumption by other users with similar interests, hobbies and/or backgrounds. It is this unique ability to share or "virally distribute" content with recommendations and referrals that now enables the Internet to be used as a highly social medium. Furthermore, this "viral" distribution capability can now be used advantageously by content promoters, such as performing artists, visual artists, video and film producers, and content distribution companies, to create creative works that can be circulated to a far greater number of prospects and partners than may have been possible previously with a distribution capability which was limited only to the content creator's current list of customers.

Current methods for achieving viral distribution of content focus on the use of electronic mail. However, a significant opportunity and need exists for enhanced capabilities to distribute content in a more immediate and engaging manner. One current approach that is used to distribute applications of limited functionality involves "web widgets." A web widget is portable software that can be installed and executed within a hypertext-markup-language web page by an end user that does not require additional compilation. The most commonly used web widgets are discrete applications of limited functionality that allow users to turn personal content into dynamic web applications which can be shared on virtually any website. Current web widgets are limited to executing certain discrete applications as on-screen tools. For example, they are currently used to display on-screen clocks, event countdowns, auction-tickers, stock market tickers, daily weather reports and flight arrival information.

Notwithstanding their useful role in these types of applications, current web widgets are not used as self-contained electronic commerce platforms. Yet, there is a significant and rapidly growing need for web widgets with enhanced capabilities that will enable content owners to more effectively use viral distribution of multimedia content and to exploit social media marketing trends to engage in purchase transactions and other forms of electronic commerce directly with current and prospective customers from web widgets over the Internet and over the rapidly growing number of mobile networks and associated mobile devices.

BRIEF DESCRIPTION OF THE DRAWINGS

Non-limited and non-exhaustive embodiments are described with reference to the following figures, wherein like reference numerals refer to like parts throughout the various views unless otherwise specified.

DETAILED DESCRIPTION

In the description to follow, various aspects of embodiments web widgets and the computing and communications system which supports their ability to perform electronic commerce transactions will be described, and specific configurations will be set forth. Numerous and specific details are given to provide an understanding of these embodiments. The aspects disclosed herein can be practiced without one or more of the specific details, or with other methods, components, systems, services, etc. In other instances, structures or operations are not shown or described in detail to avoid obscuring relevant inventive aspects.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1A:
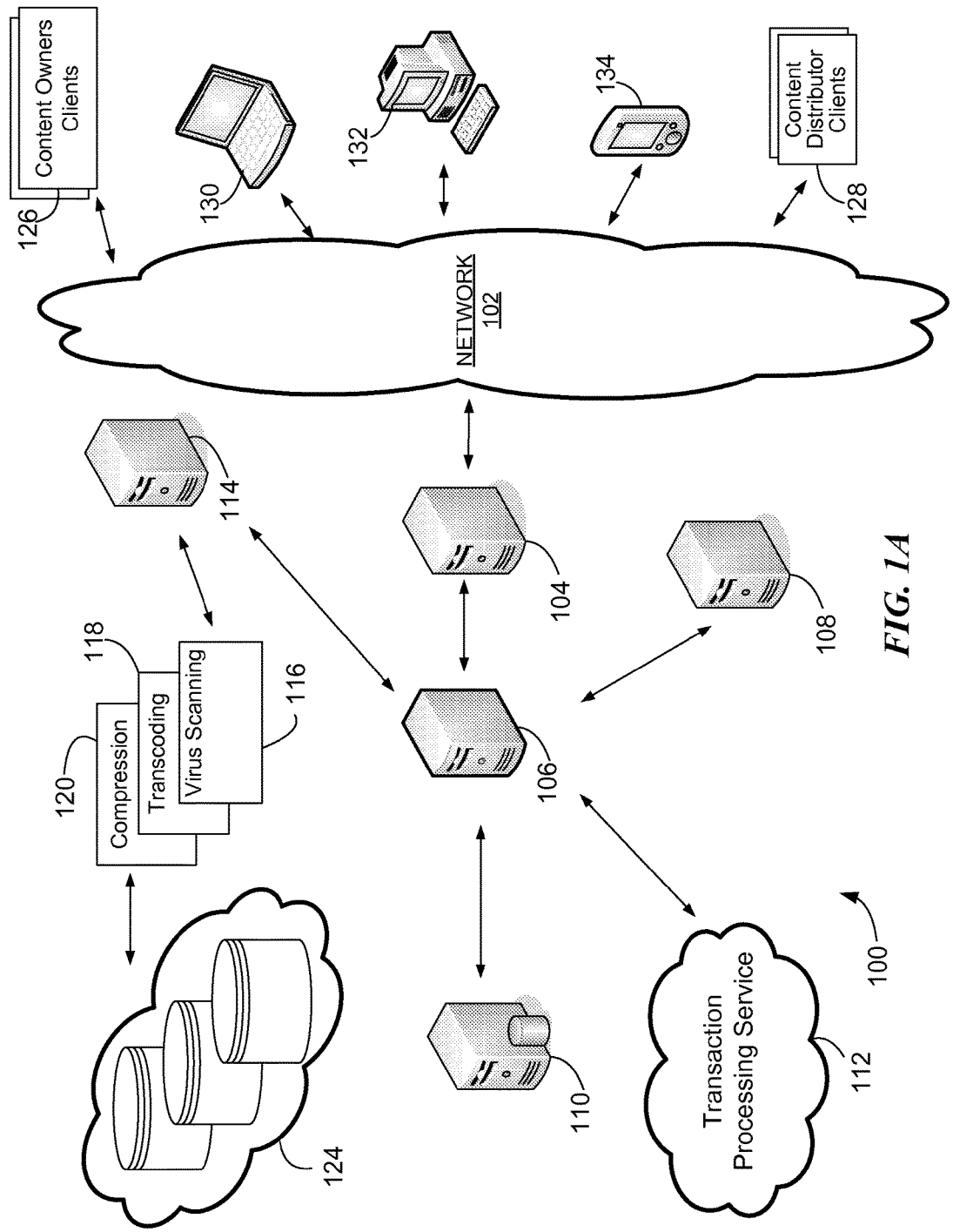
FIG. 1A is a block diagram illustrating an operating environment for a multimedia content distribution system.

FIG. 1A is an illustration of an operating environment for a multimedia content distribution system in an embodiment. In this operating environment 100, one or more content distributor client devices 128, one or more content owner client devices 126, and one or more consumer client devices 130, 132, 134 are illustrated. Among the range of consumer client devices used for the distribution of multimedia content from the multimedia content distribution system are laptop computers 130, desktop computers 132 and various types of a mobile computing devices 134 such as personal digital assistants (i.e., PDAs). As used here, the term "personal digital assistant" means both phone-enabled PDAs (i.e., smart phones) and non-phone enabled PDAs. Each of these client devices is communicatively coupled to a network 102 which provides secure computing and communications access through a server 104 executing a firewall software to an application server 106, which in this embodiment acts as a centralized compute processing and transaction management resource. In the illustrated embodiment, the network 102 is the Internet. However, in other embodiments, the network 102 can be a private computer-communications network, a wireless communications network, or other computer data communications network that can enable communications between and among computer devices, mobile devices, the multimedia content distribution system and its infrastructure resources for storage and transaction processing.

The application server 106 is communicatively coupled to a database server 110, a transaction processing service 112, an email server 108 and a file management server 114. The file management server is communicatively coupled to one or more computing resources that perform file virus scanning 116, file transcoding 116 and file compression 120 for files which are stored on a cloud-based storage resource 124. In an embodiment, the database server 110 is used to maintain a lookup table of all content files and related metadata which are stored on the cloud-based storage resource 124. The file management server 114 is used to control the file conversion process from a first format in a received file to one or more transcoded formats. In an embodiment, a select subset of the transcoded files will then be compressed into a single file using file compression 120 and then stored on the cloud-based storage resource 124 along with related metadata for each file. In one embodiment, the files are compressed into a WinZip file for storage on the cloud-based storage resource 124. The email server 108 is used in an embodiment to facilitate electronic mail communications between and among content owners and content distributors, as well as email broadcasts to groups of consumers and prospects. In addition to its role in managing the use of resources in the multimedia content distribution system, the application server 106 is also used for the creation of user account profiles, the execution of one or more web servers, and the execution of a content management system including a widget builder resource component and a market management component. The web servers are used to receive and respond to content related requests received from consumer client devices 130, 132, 134.

In one embodiment, content owners using their client devices 126 upload, register in a lookup table stored on the database server 110, manage, package, price and create one or more compilations of stored and registered content for distribution to one or more consumer client devices 130, 132, 134 using compilation-specific web widgets that are created and capable of distribution from the application server 106. In creating web widgets, the application server 106 will check the lookup table stored on the database server 110 to confirm the availability and format of content files included in or associated with the web widgets. This process is also followed when new buttons, links or preview clips are created by content owners for subsequent distribution from the application server 106. The web servers executed on the application server 106 are used to respond to requests received from web widgets, buttons, links or preview clips executed or selected in browsers running on the consumer client devices 130, 132, 134

The content distributor client devices 128 are used by content distributors to provide content distribution feeds to update the content inventories of content owners with active accounts in the multimedia content distribution system on the application server 106. These inventories can be updated with content from distribution feeds upon request of the content owners or the operators of the multimedia content distribution system. In one embodiment, the distribution feeds provide content in bulk which is parsed by a content management system executed on the application server 106 to ensure that each content owner receives the content desired for inclusion in their respective content management systems. Each distribution feed is parsed and the content is allocated to each content owner's account as specified in the distribution feed. Once parsed, the content delivered in these distribution feeds is uploaded, master content files are transcoded to one or more alternative file formats preselected by content owners, the content files and their transcoded variants are stored in the cloud-based storage resource 124, and references to the stored content files and transcoded variants are registered in one or more lookup tables maintained on the database server 110. Once uploaded and registered on the database server 110, the content included in these distribution feeds can be accessed and used by content owners to create new content compilations for association with web widgets using a widget builder resource component executed on the application server 106. In an embodiment, a content compilation is an aggregation of one or more multimedia content files and associated metadata. Once created and associated with specific multimedia content and related metadata, these web widgets are available for viral distribution by content owners to networks of current and potential consumers.

In one embodiment, the cloud-based storage resource 124 and the transaction processing service 112 are provided by the Amazon Web Services group at Amazon.com, Inc. More particularly, in the embodiment, the cloud-based storage resource is implemented using Amazon's "Simple Storage Service" (S3) which provides a data storage capacity that can be used to store and retrieve any amount of data, at any time, from anywhere on the World Wide Web. Likewise, in an embodiment, the transaction processing service 112 is implemented using Amazon's "Flexible Payments Service" (FPS) to facilitate the payment processing and checkout process once consumers decide to purchase and download content from virally distributed web widgets, buttons, links or preview clips. In this embodiment, the FPS is used to process payments from consumers who wish to purchase registered multimedia content promoted in virally distributed web widgets, buttons, links or preview clips using their credit cards, debit cards or bank account information. Furthermore, in an alternative embodiment, the file virus scanning 116, file transcoding 118 and file compression 118 processes are implemented using Amazon's "Elastic Compute Cloud" (EC2) resources instead of dedicated, proprietary servers. The EC2 is a web service that provides resizable compute capacity in a cloud-based network that can be scaled to provide computing capacity for applications serving multiple client devices.

Consumers using browsers executing on their client devices 130, 132, 134 can activate web widgets directly or indirectly. A web widget can be activated indirectly if a consumer receives a button or link and then clicks on the button or link which results in the activation of a web widget. Likewise, a consumer can directly activate a web widget if it is received from the content owner or a third party who has opted to share or redistribute the web widget. Once activated, a consumer can opt to preview the content which has been packaged with the web widget, share the web widget with third parties or elect to purchase the multimedia content packaged with the web widget. If a consumer elects to purchase specific multimedia content files by clicking on an embedded buy button, then the web widget provides the consumer with a choice of format options and then redirects the consumer to the transaction processing service 112 for the provision of credit card, debit card or bank account information and completion of the purchase transaction. Once the purchase transaction is completed, the selected multimedia content files are downloaded by the web widget from the cloud-based storage resource 124 to the consumer's designated client device 130, 132, 134.

Figure 1B:
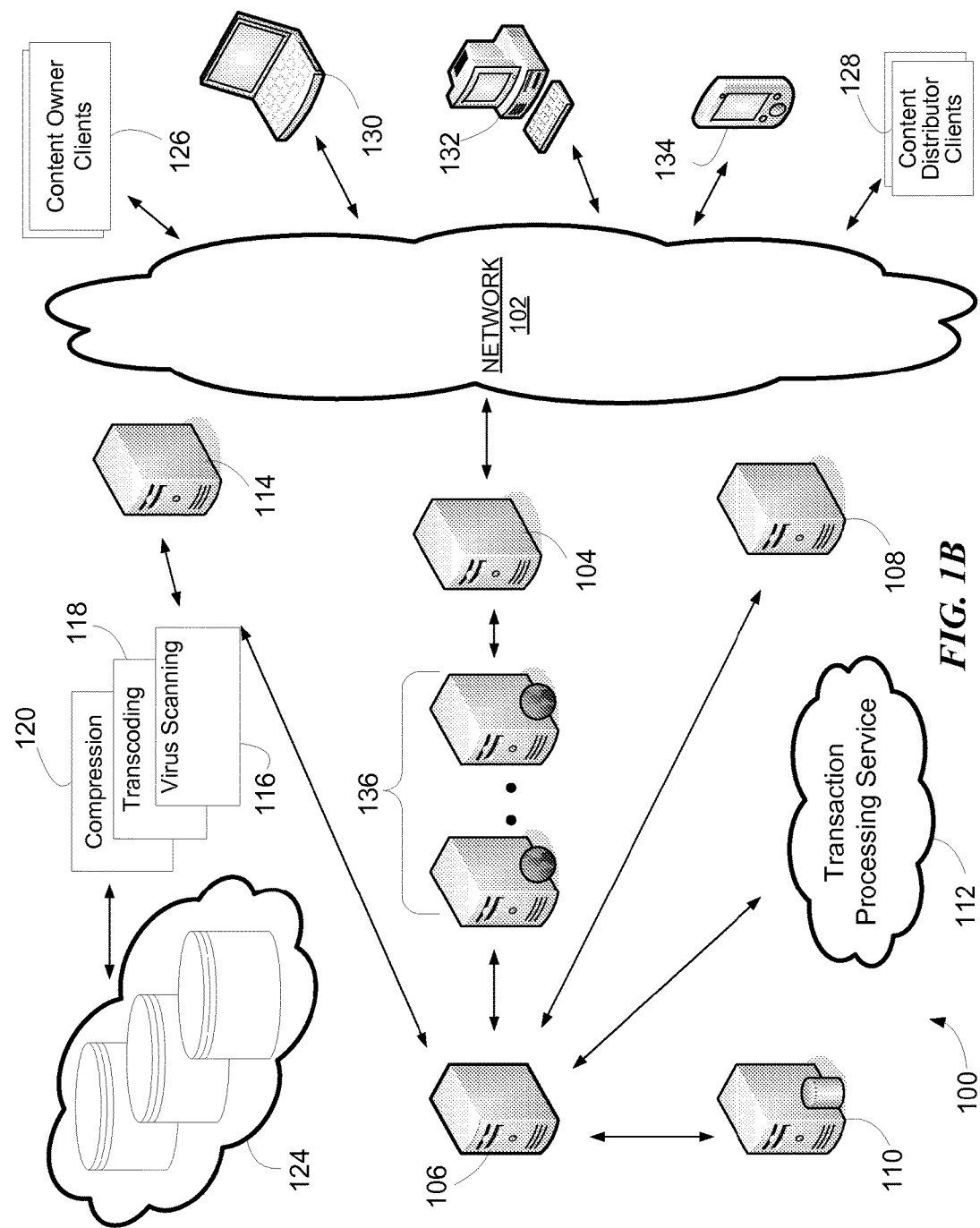
FIG. 1B is a block diagram illustrating an alternative operating environment for a multimedia content distribution system.

FIG. 1B is an alternative embodiment of the operating environment of the multimedia content distribution system 100. In this operating environment, one or more web servers have been added as independent computing resources for use in receiving and responding to content related requests from various client devices 130, 132, 134. This embodiment is computationally more efficient and enables the application server 106 to be dedicated to the operation of a content management system and the control of processes on the other servers used in this operating environment. As discussed above, these servers include an email server 108, a database server 110, a file management server 114, and control over a transaction processing service 112 and content conversion services for file virus scanning 116, file transcoding 118, and file compression 120 for storage in the cloud-based storage resource 124.

Figure 2:
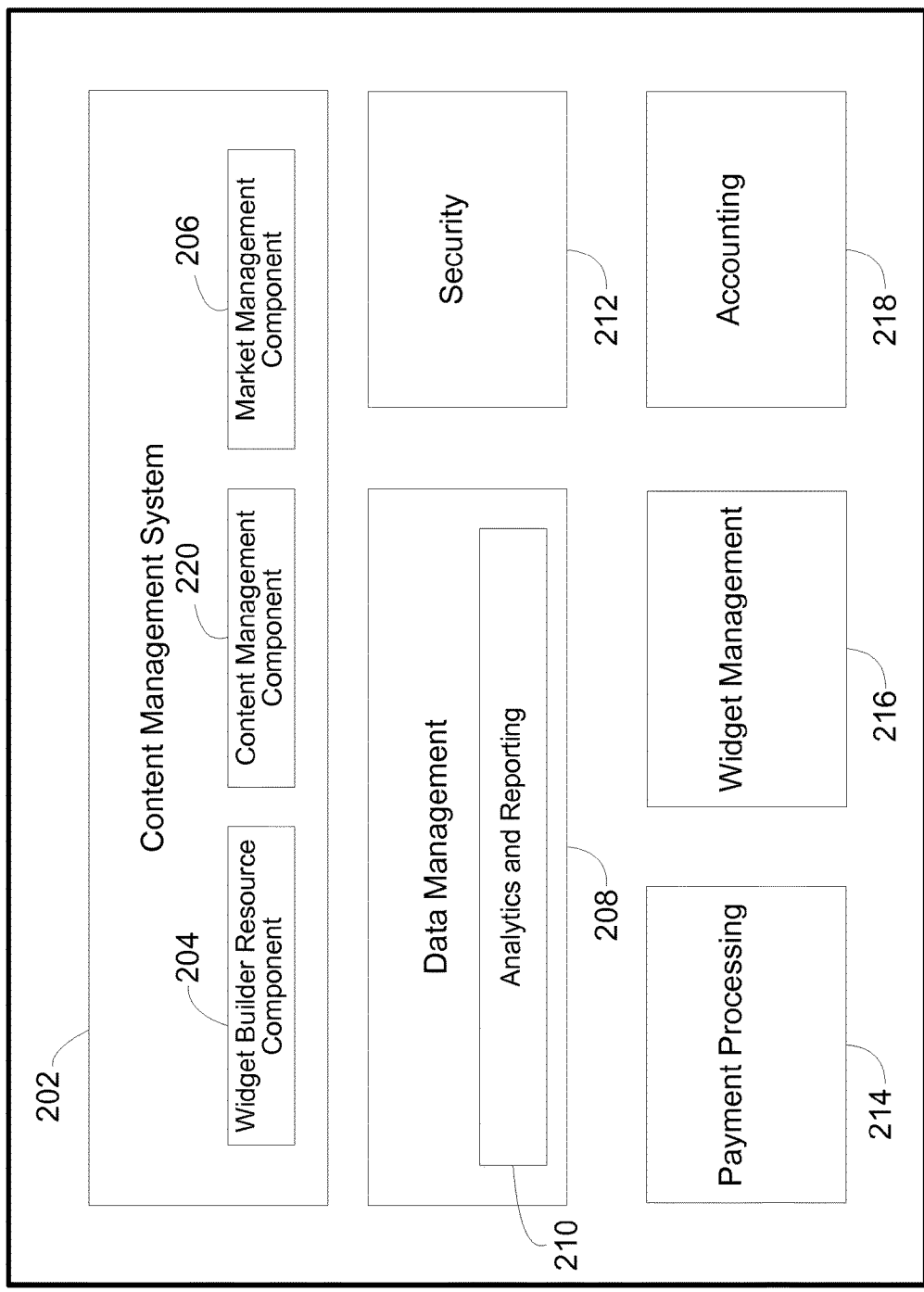
FIG. 2 is a block diagram illustrating the software components of a multimedia content distribution system in an embodiment.

FIG. 2 is an illustration of an embodiment of a multimedia content distribution system 200. In this embodiment, the system 200 is comprised of a content management system 202, a data management service 208, an analytics and reporting service 210, a security service 212, a transaction payment processing service 214, a widget management service 216 and an accounting service 218. The content management system 202 is comprised of three components, a widget builder resource component 204, a content management component 220, and a market management component 206. The content management component 220 is used for the uploading of multimedia content, the editing of metadata related to the content and the creation of compilations of content into marketable packages that can be associated with one or more web widgets. In addition to controlling the uploading, editing and creation of content compilations through the content management component 220, the content management system 202 also controls the processes applied to uploaded content files for virus scanning, file transcoding and file compression for storage in the cloud-based storage resource 124. The widget builder resource component 204 is used to create various marketing resources including new web widgets, buy buttons, links and preview clips. In one embodiment, the buy buttons, links and preview clips are each communicatively coupled to a web widget so that the selection or clicking on a button, link or preview clip causes the activation of a web widget. Once these marketing resources are created, content owners can use them in viral distribution marketing campaigns to promote their content compilations. The market management component 206 is used by content owners to assign market rules and pricing terms to selected items included in a content compilation. In one embodiment, the items include individual songs, song releases, or entire song catalogues. In a different embodiment, the items include reports, physical merchandising paraphernalia (e.g., cups, t-shirts, hats, etc.), and other electronic goods.

The data management service 208 is used to maintain a lookup table for use in tracking the locations of stored multimedia content files in the cloud-based storage resource, transcoded variants of these files, compressed files including one or more copies of content files and transcoded files, and files storing usage statistics collected by one or more web servers from the web widgets, buy buttons, links, preview clips or other marketing resources which are created and distributed by content owners and third parties. The analytics and reporting service 210 in one embodiment is a subcomponent of the data management service 210 and is used to analyze compiled analytical data, transaction statistics and location statistics for the marketing resources used by content owners in promoting their multimedia contents over one or more networks. More specifically, the analytics and reporting service 210 compiles transaction statistics and location statistics arising from the viral distribution of web widgets and related purchase transactions initiated and completed over web widgets which have been distributed over such networks. In an alternative embodiment, the analytics and reporting service is a stand-alone service which independently interacts with the data management service 210 and the one or more web servers comprising the widget management service 216 which are used for the tracking of web widgets and other marketing resources and the collection of usage statistics from these resources.

The security software service 212 provides content owners, distributor clients and consumer clients with secured access to the multimedia content distribution system 200 and its operating infrastructure. In one embodiment, the security service 212 is implemented using firewall software to restrict access to the application server 106 and other computing resources used as part of the operating environment for the multimedia content distribution system 200. The payment processing service 214 provides direct access to transaction processing resources for the completion of purchase transactions initiated by consumers who use web widgets to preview, purchase and download multimedia content. In one embodiment, the payment processing service 214 is provided by the Flexible Payment Service (FPS) offered by Amazon.com, Inc. The payment processing service 214 is used for the facilitation and execution of payment transactions using credit cards, debit cards or other bank account information.

The widget management service 216 is implemented on one or more web servers and is used for the tracking of web widgets which have been distributed to and activated on Internet websites or on other accessible locations and resources over other networks. Once a web widget has been distributed or activated from a link, buy button or preview clip, it can be further distributed in a "viral" fashion to other online communities, websites, forums, etc. In one embodiment, the widget management service 216 is implemented on web servers which are co-hosted on the application server 106. In an alternative embodiment, the widget management service 216 is implemented on one or more independent web servers 136. In both embodiments, however, the widget management service is used for receiving and responding to requests for multimedia content received from web widgets. In addition, the web servers implementing the widget management service 216 also perform data collection and activity monitoring on deployed web widgets. The data collected by the web servers includes transaction statistics, location statistics, usage statistics and other pertinent market statistics for each web widget which has been created, activated and distributed over the Internet, mobile networks or other computer communication networks by the content owner or third parties, such as consumers and members of their online social networks. Once a web widget is activated, the web servers implementing the widget management service 216 compile the data statistics into one or more files which are stored in the cloud-based storage resource 124 and a reference to the stored data collection files is created in the lookup table maintained by the data management service 208 and associated with the multimedia content files and any related transcoded files which have been packaged with each web widget for which the statistics have been collected. In an alternative embodiment, the one or more data collection files including the data statistics are stored on the database server 110 where the lookup table is maintained by the data management service 208.

The accounting service 218 provides account transaction reconciliation for each content owner having an active account on the content management system 202. By using the accounting service 218, content owners can track the number and type of available content in their inventories of content files, the number of transactions performed relative to the total number of available content files, the number of transactions which have been returned for credit to consumers, the number of completed transactions, and revenue earned from completed transactions.

Figure 3:
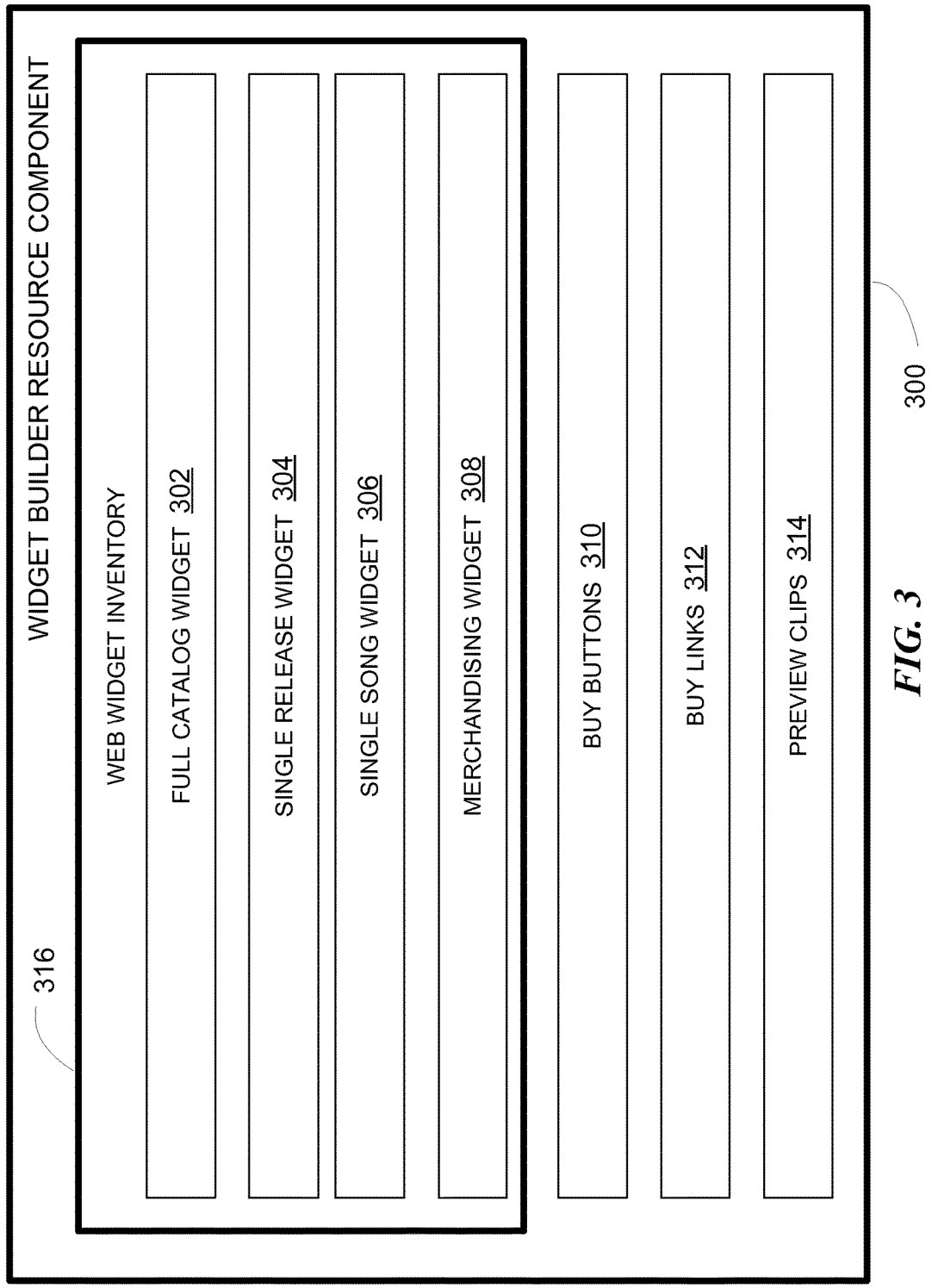
FIG. 3 is a block diagram illustrating a widget builder resource component used in a multimedia content distribution system in an embodiment.

FIG. 3 depicts an embodiment of a widget builder resource component. The widget builder resource component 300 is used to create an inventory of "web widgets" 316, buy buttons 310, buy links 312 and preview clips 314. In an embodiment, the web widget inventory 316 includes services for creating web widgets for packages of marketable multimedia content including, in one embodiment, full catalogs of digital music content, single releases of digital music content and single song digital music content. The widget builder resource component 300 is also used to create a merchandising widget 308 to promote a content owner's physical goods and related materials as marketing merchandise. Examples of such physical goods are coffee mugs, t-shirts, hats, jackets, etc. In the present embodiment, the web widgets pertain to musical content which is often compiled in the form of musical catalogs, musical releases, and single songs. A full catalog widget 302 is used for the promotion of the full musical catalog of a content owner. In one embodiment, the full catalog widget 302 is used to execute a video clip that provides a preview of the content in a content owner's inventory in the multimedia content distribution system 200 that is packaged with the web widget. The web widgets 302, 304, 306, 308 are also used to facilitate electronic commerce transactions involving the purchase or licensing of multimedia content, such as musical selections as shown in this embodiment, in the specific groupings desired (i.e., catalog, release, or single song).

A single release widget 304 is used to promote a single musical release of a content owner from content stored in a content inventory of the multimedia content distribution system 200 in an embodiment. A single song widget 306 is used to promote a single song provided by a content owner in an embodiment. The merchandising widget 308 is used to promote the merchandise or physical goods that a content owner may choose to promote alone or in association with one or more multimedia content files in an embodiment. The merchandising widget 308 is used when a content owner seeks to create a fully custom content compilation which may include promoted merchandise or physical goods (e.g., cups, hats, t-shirts, etc.), a subset of content from specific releases as well as other content from the content owner's catalogue which is not included in any specific release. The buy buttons 310 are generated by content owners using the widget builder resource component 300 and linked to web widgets. The buy buttons 310 can be customized and distributed to online resources on the Internet, on mobile communication networks or on other computer networks for use in promoting the various groupings of multimedia content available from a content owner. Once a buy button 310 is clicked or selected by a consumer, it will activate its linked web widget and take the consumer to a checkout screen in the web widget. The buy links 312 are Hypertext Transfer Protocol (HTTP) links that are created by content owners for widespread, viral distribution on the Internet, on mobile communications network or on other networks that enable consumers to click on such links to activate web widgets associated with these links that promote their multimedia content files and related merchandise. The preview clips 314 created in the widget builder resource component 300 are linked to web widgets but are designed to automatically execute video and audio clips in the browsers of consumer client devices 130, 132, 134 to enable those consumers to preview multimedia content and to make informed choices about the multimedia content they may elect to purchase and download to their client devices 130, 132, 134, or to further distribute to third parties in the social networks of these consumers or in other online communities. Upon completion of an executing video clip, the linked web widget which will have been activated at the start of execution of the preview video clip will be displayed in the browsers of the consumer client devices 130, 132, 134 to aid the consumer in making a purchase or distribute decision.

Figure 4:
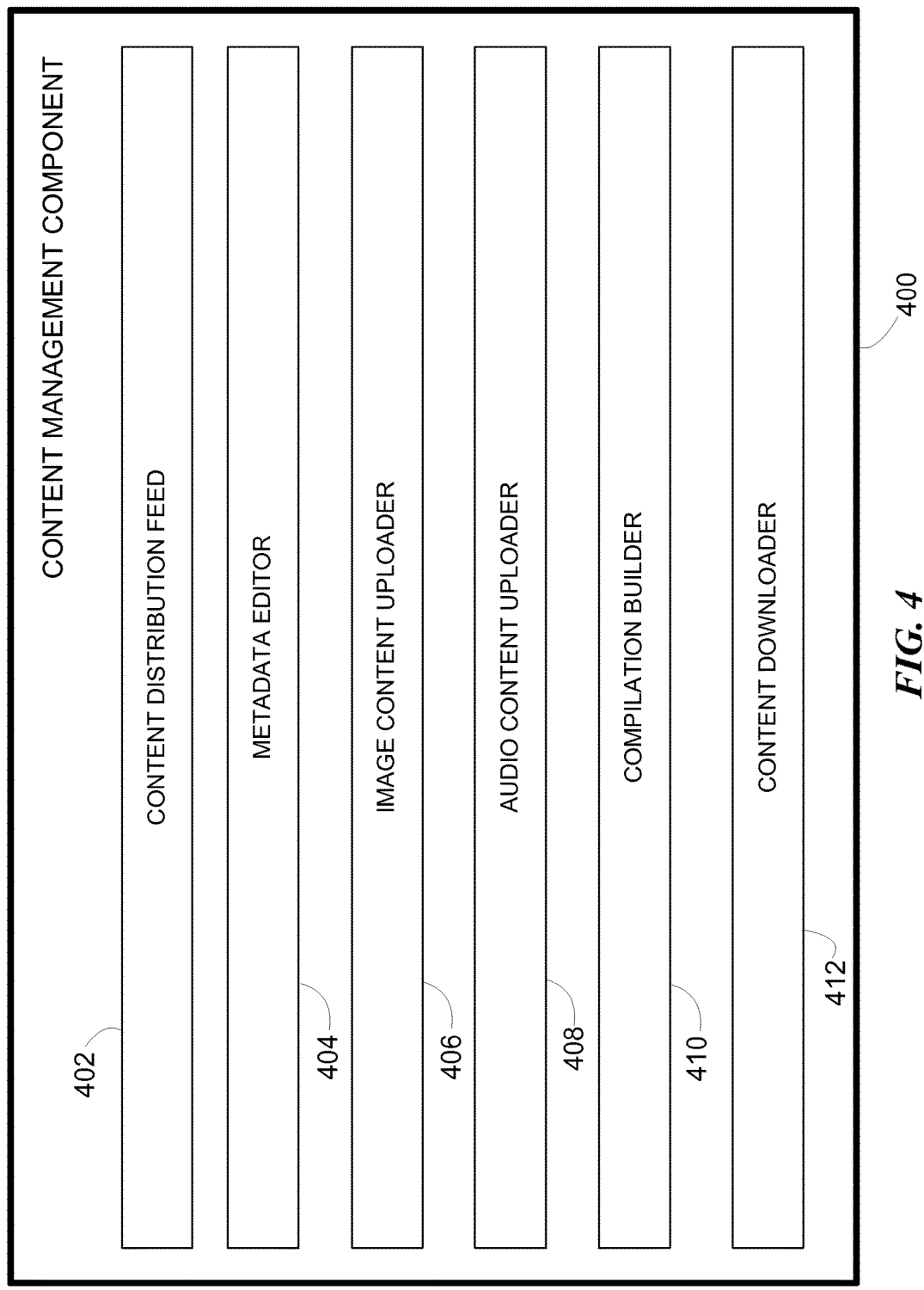
FIG. 4 is a block diagram illustrating a content management component used in a multimedia content distribution system in an embodiment.

FIG. 4 illustrates an embodiment of a content management component 400. The content management component 400 is comprised of several services. The content distribution feed 402 is a service that enables content owners to request and receive distribution feeds from content distributors. The content provided by content distributors to content owners through such feeds is used to automatically update and supplement the content inventories of content owners in the content management system 202. The metadata editor 404 is a service that enables content owners to edit the metadata associated with multimedia content files. In one embodiment, the type of metadata that can be edited includes information pertaining to the musical content of a content owner such as title, artist name, release date, genres, catalogue number and Universal Product Code. Image Content Uploader 406 is a service that uploads, store and registers image files provided by content owners for use in creating marketable compilations of content associated with web widgets. In one embodiment the types of image files which can be uploaded using the Image Content Uploader 406 are GIF files, JPEG files and TIF files. Audio Content Uploader 408 is used for uploading audio files. In an embodiment the audio file types that can be uploaded using the Audio Content Uploader 408 include WAV files and MP3 files. The compilation builder 410 is used by content owners to create custom compilations from the content available in the content inventories managed by the content management system 202. In an embodiment, each content compilation created using the compilation builder 410 is associated with a web widget that will be distributed using the web distribution service 216 to consumers on the Internet, mobile communications networks, or other computer communications. Lastly, the content downloader 412 is used for controlling the downloading of the custom content compilations created by content owners which are packaged with and promoted through web widgets. Upon receipt of a content download request from a web widget, the content downloader 412 initiates and controls the process of retrieving the packaged content compilations associated with and promoted through the web widget from the cloud-based storage resource 124 or other storage in the multimedia content distribution system 200, and it also controls the process of downloading the retrieved content compilations to a client device 130, 132, 134.

Figure 5:
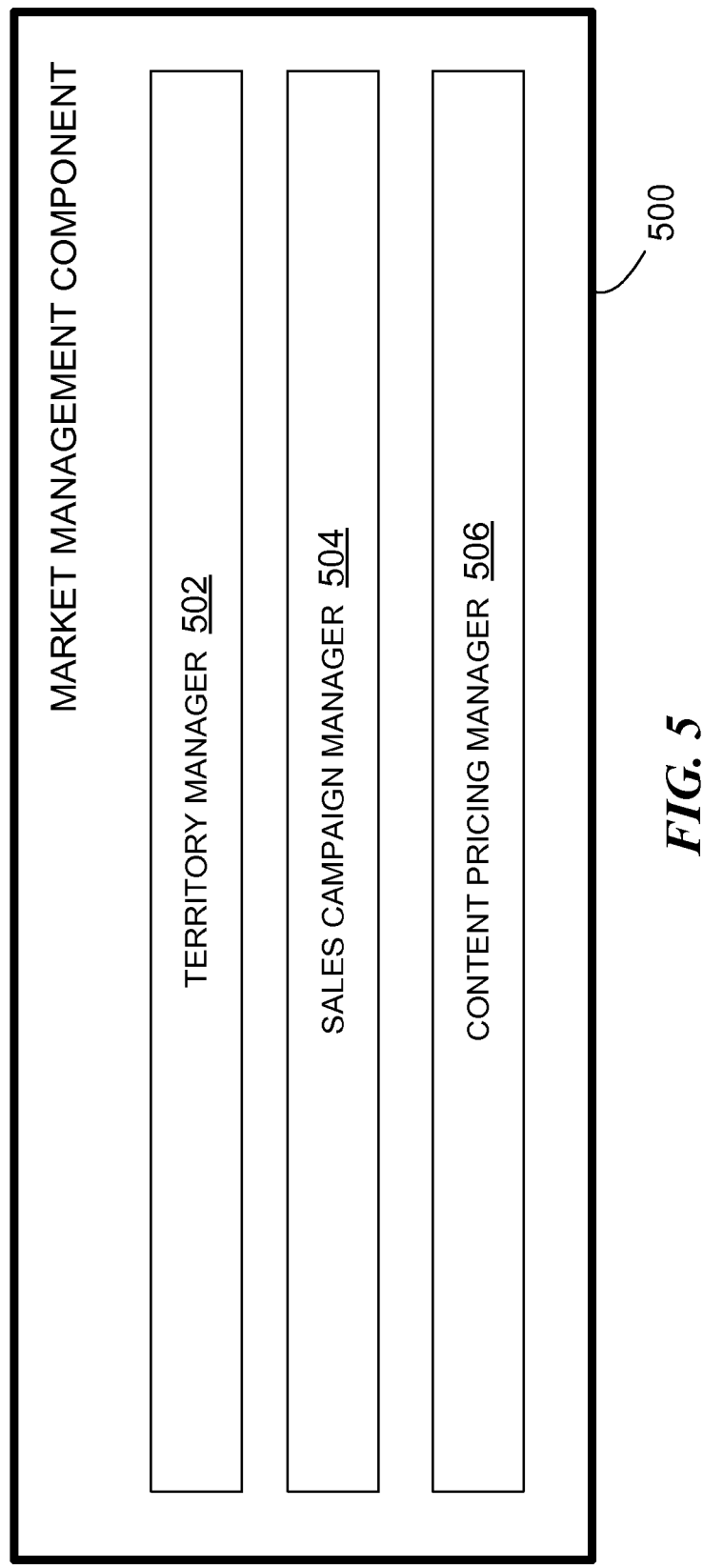
FIG. 5 is a block diagram illustrating a market management component used in a multimedia content distribution system in an embodiment.

FIG. 5 illustrates the services provided in an embodiment of a market management component 500. As shown, one service is a territory manager 502 which is used by content owners to set the sales parameters and the timing of sales campaigns relating to specifically available content from a content owner in different geographic regions of the world. For example, a content owner may choose to provide a subset or only a particular release version of certain musical content for sales and marketing campaigns in Spain, Germany or France. While in other parts of the world, the content owner may choose to set different territorial restrictions on the availability of their content such as limiting the availability of musical content only to earlier releases rather than later releases in an entirely different part of the world, such as South America or in specific South American countries. The sales campaign manager 504 is another service provided in an embodiment of the market management component 500 that enables content owners to enable and disable sales campaigns by specified dates. The content pricing manager 506 is a service that allows content owners to set the pricing of particular files by file type. Although not limited only to musical content, in one embodiment the content pricing manager 506 is used to set pricing for MP3 file types and for WAV file types. Although the present embodiment is described with respect to the use of musical content stored in MP3 and .WAV file formats, the use of a content pricing manager 506 is not limited to the pricing of content for musical files or even to the pricing of files in these two types of file formats, but can be applied broadly to the pricing of content in image files, video files, audio book files, or video game files as well as in other file types and file formats of multimedia content generated by content owners.

Figure 6:
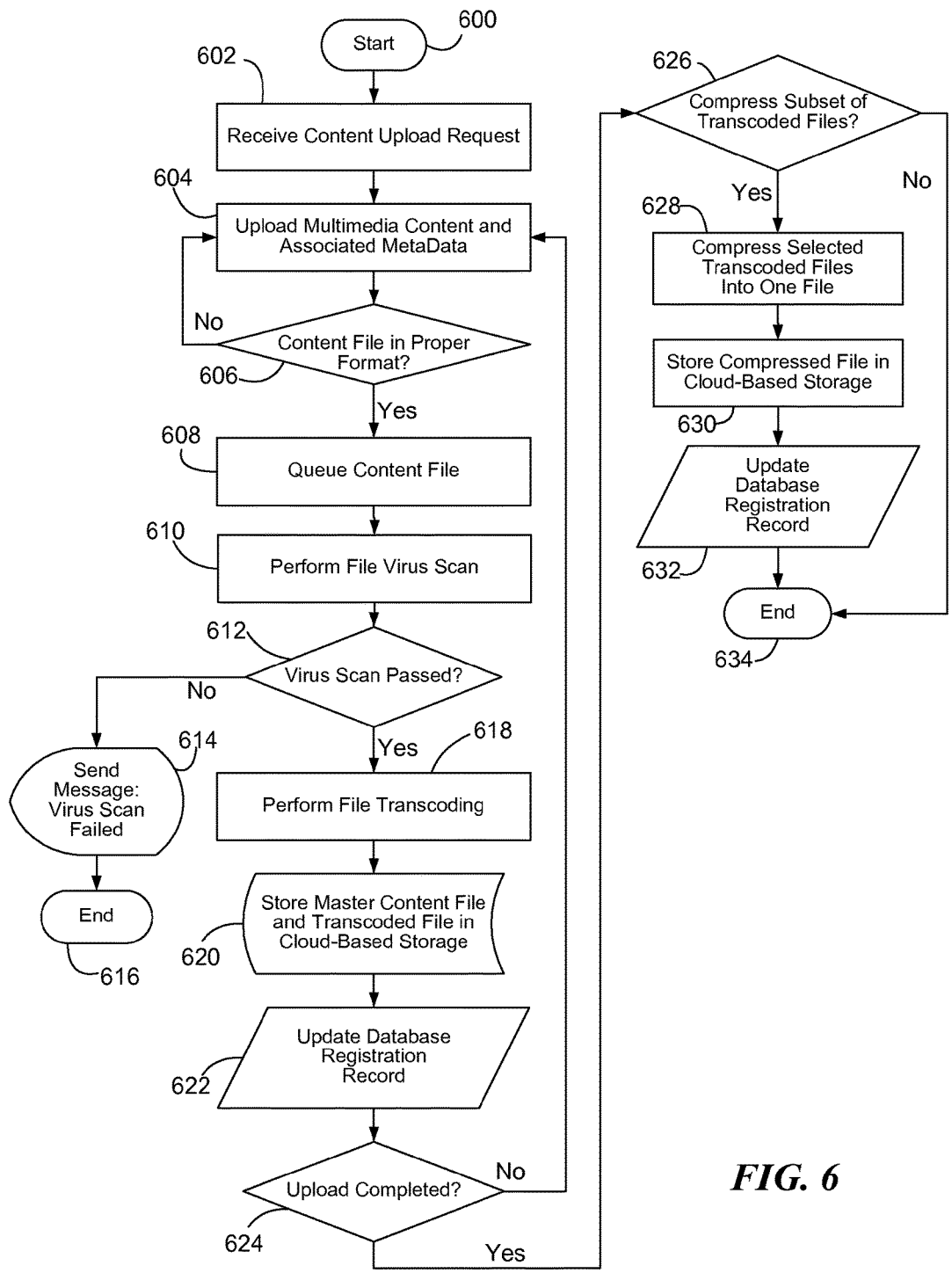
FIG. 6 is a flow chart illustrating a method for uploading and converting multimedia content used in a multimedia content distribution system in an embodiment.

FIG. 6 is a flow chart illustrating an embodiment of a process for uploading and transcoding multimedia content files. The process commences at step 600 and begins with the receipt of a content upload request 602 from one or more content owner client devices 126. Upon receipt of an upload request, the content management system 202 begins the uploading of multimedia content files and associated metadata, as shown at step 604. In one embodiment, associated metadata includes information about the multimedia content such as artist name, album title, song title release name or catalogue name. Continuing with this process, the content management system 202 will confirm whether each received content file is in a proper format for uploading to the multimedia content distribution system, as shown at step 606. If the file format is improper, such as when the integrity of the file has been compromised, the process returns to step 604 for the continued uploading of the next multimedia content file and associated metadata. If the content is in a proper format, the process continues with a placement of each newly received content file into a queue, as shown at step 608. After placement in the queue, the file will be scanned for viruses, as shown at step 610, and a test will be applied to confirm whether the virus scan was passed, as shown at step 612. If virus scanning is unsuccessful, the process will transmit a message to the content owner for display in the browser of a content owner client device 126 indicating that the virus scan failed, as shown at step 614, and that the process will then end, as shown at step 616. If the virus scan was passed, the process continues with the transcoding of the content file, as shown at step 618. In an embodiment, the content owner can select one or more file formats for transcoding of each uploaded multimedia content file, which file formats may include Windows Media Audio (WMA), Advanced Audio Coding (AAC), Apple Lossless Audio Codec (ALAC), Free Lossless Audio Codec (FLAC), WMA Lossless and MP3. After a file has been transcoded, the process continues with the storing of the originally uploaded content file, referred to as a "master content file," and each transcoded file specified by a content owner. The master content file and any transcoded files are stored in the cloud-based storage resource 124, as shown at step 620. Upon completion of the storing of these files, the process updates a data base registration record, as shown at step 622. The database registration record is maintained in a lookup table on a database server 110. If multiple multimedia content files are uploaded, for example as part of an album upload or a catalogue upload, the process confirms whether the uploading has been completed, as shown at step 624. If the process has not been completed, then the uploading will continue with the uploading of additional multimedia content files and associated metadata, as shown at step 604. In one embodiment, if the upload process has been completed, the content owner can select a subset of the transcoded files of a given file type to be compressed into one file, as shown at decision step 626. For example, in an embodiment, when a master content file in the .WAV format is uploaded, the content owner can have multiple transcoded files (e.g., an MP3 format file, a WMA format file, an FLAC format file) created from the master content file during the transcoding process, shown at step 618. After selection of the desired files, the content management system 202 will compress the transcoded files (e.g., the WMA format files) into a single compressed file, as shown at step 628. In an embodiment, the selected subset of transcoded files is compressed into a Winzip file. Upon completion of the compression process, the compressed file is stored in the cloud-based storage resource 124, as shown at step 630, and the database registration record will be updated once again, as shown at step 632, to identify the storage location of the compression file and its logical relationship to the master content file and related transcoded files. The process then ends, as shown at step 632. Alternatively, if no files are selected for compression at decision step 626, then the uploading and transcoding process will end, as shown at step 634.

Figure 7A:
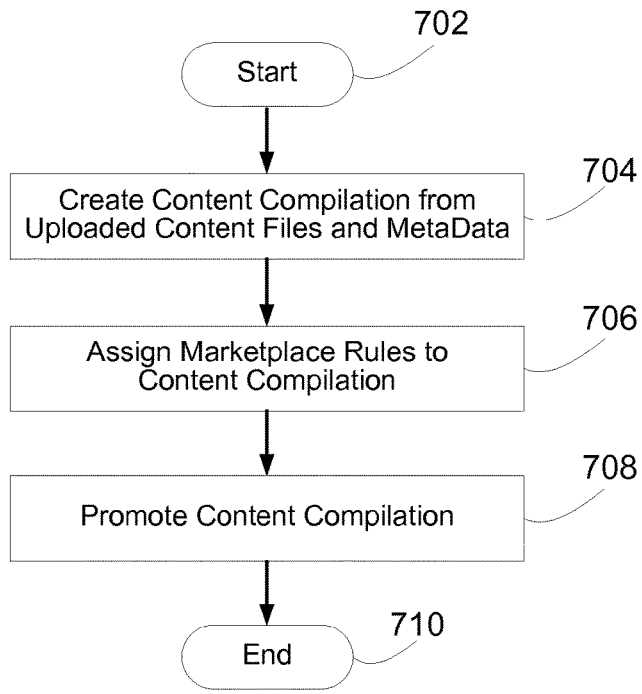
FIG. 7A is a flow chart illustrating a method for creating marketable compilation of multimedia content in a multimedia content distribution system in an embodiment.

FIG. 7A is an illustration of a process used by content owners to convert uploaded content files into marketable products for packaging with web widgets. In an embodiment, each uploaded content file represents an item for promotion and distribution. Each "item" is made available as a "product" for marketing purposes after being associated with a web widget. The process of creating products starts at step 702 and begins with a content owner creating a content compilation from uploaded content files and metadata, as shown in set 704. Afterwards, the content owner assigns marketplace rules to the content compilation, as shown at step 706, and then generates one or more web widgets, links, buttons, or preview clips to promote the content compilation, as shown at step 708, and the process then ends, as shown at step 710. The content compilation is the "product" for marketing and promotion purposes and the compilation may be comprised of one item (e.g., a single song), multiple items (e.g., the items comprising a musical "release" or a musical "catalog," etc.), identifiers of physical goods or marketing merchandise (e.g., cups, t-shirts, hats, a book of thematic poetry, etc.), or any combination of these items and identifiers. In one embodiment, the identifiers of physical goods or marketing merchandise are either a Universal Product Code (UPC), a Stock Keeping Unit (SKU) number, or a Globally Unique Identifier (GUID). In a different embodiment, the marketplace rules assigned by a content owner at step 706 can include territorial rights and restrictions (e.g., album collection A only available for sale in Spain, UK and France, but not in Italy, Germany, etc.), gross pricing terms, volume pricing discounts, and the starting and ending dates of sales or other product specials.

Figure 7B:
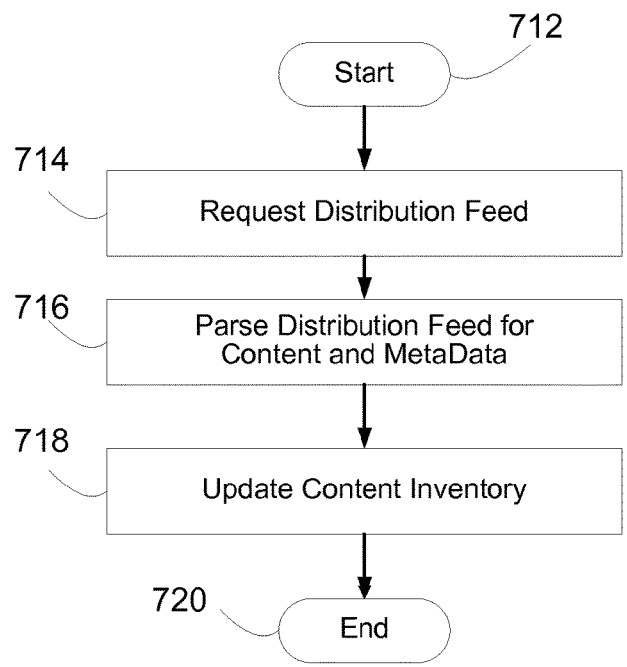
FIG. 7B is a flow chart illustrating a method for updating content inventories in a multimedia content distribution system in an embodiment.

FIG. 7B is an illustration of a process for requesting and updating content inventories using distribution feeds. This process commences at step 712 and is initiated by the placement of a request for a distribution feed through the content management system 202 by a content owner, as shown step 714. In one embodiment, content owners may explicitly request or opt to receive distribution feeds from content distributors with whom they have existing business relationships. In an alternative embodiment, the operators of the multimedia content distribution system 200 acting on behalf of one or more content owners can request distribution feeds for content owners to ensure that the content inventories maintained in the multimedia content distribution system 200 are updated and available for the creation of content compilations. As illustrated, once a distribution feed is received it is parsed for content and metadata, as shown at step 716, and the content inventory or inventories maintained by content owners are updated, as shown at step 718.

Upon receipt and updating of one or more content inventories, the process ends, as shown at step 720. Content distribution feeds received from distributor clients in one embodiment contain content from multiple artists including multiple content items such as songs, album content and catalogue content. The parsing of the distribution feed, as shown at step 716, selectively parses this distribution feed according to content owner so that each content owner will have each of his or her content inventories automatically updated even though multiple content owners and multiple content files associated with each content owner may be included in a single distribution feed.

Figure 8:
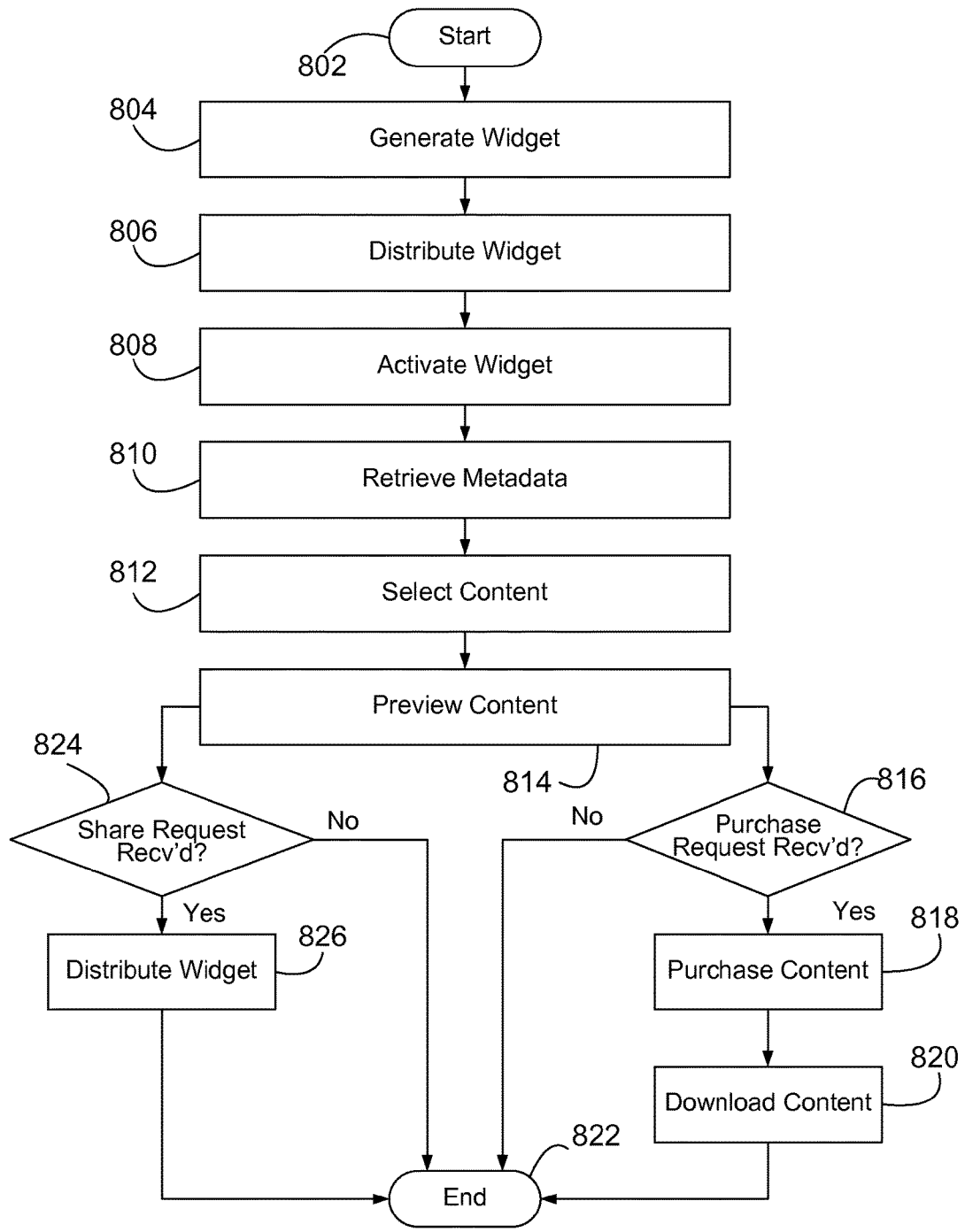
FIG. 8 is a flow chart illustrating a method for distributing multimedia content using a web widget in an embodiment.

FIG. 8 is an illustration of a process for generating web widgets and distributing them over networks to facilitate the promotion, distribution and execution of purchase transactions for multimedia content using web widgets. This process commences as shown at step 802 with the generation of a widget as shown at step 804. A content owner can generate one or more web widgets to promote different packages of multimedia content. In one embodiment in which the multimedia content consists of musical works, among the types of web widgets that can be generated are single song widgets, song release widgets, song catalogue widgets, and merchandising widgets. A single song widget is used to promote a single song of a content owner. A release widget is used to promote a compilation that includes multiple songs or multiple forms of content created by a content owner (e.g., a combination of musical selections, t-shirt, cup, hat and a book of the content owner's writings, etc.). A catalogue widget is used to promote the entire catalogue of creative works of a content owner. A merchandising widget is used to promote physical goods such as t-shirts, cups, carrying case, etc. that may be associated with the theme set by a content owner for a song, a release of songs, or the content owner's catalogue.

Upon generation of a new web widget, it can be distributed over the Internet or other network, as shown at step 806, to a website where interested parties can activate it or further distribute it to third parties on a network. Once received within a browser on a client device, a web widget exists in an inactive mode but can be placed into an active mode when an end user clicks upon or makes a selection on the web widget, as shown at step 808. In the case of laptop computers 130 and desktop computers 132, the web widget can be executed in web browsers such as Internet Explorer, Firefox, Google Chrome, Safari, Opera and in other popular web browsers. On mobile client devices 134, such as personal digital assistants, the web widget can be executed in browsers such as Microsoft IE for Mobile devices, Google Android, Bolt, Teashark, Safari and Opera Mini. In one alternative embodiment, a web widget can be activated when an end user clicks on a buy button, HTTP link or preview clips that is communicatively coupled to the web widget. Upon activation of a web widget, it will retrieve multimedia display files and the metadata associated with the multimedia content that has been packaged and associated with it, as shown at step 810. Afterwards, the web widget will stream a portion of selected content, as shown at step 812, so that the content portion can be previewed by the end user or consumer who has activated the web widget, as shown at step 814. The selected content is determined from a selection request that includes one or more content selections made by the consumer or end user on the web widget. The multimedia display files are used to display visual representations of the multimedia content which is available to be previewed and purchased from within the web widget. In generating a selection request, a consumer will click on a checkbox associated with content, or alternatively, click on one or more of the multimedia display files associated with each of the multimedia content files. In one embodiment of a web widget used for distribution of a musical catalogue, the multimedia display files include visual representations of the cover art used on each album in the musical catalogue. In other embodiments, the multimedia display files include visual representations of other types of works (e.g., book covers in a portfolio, artistic contributions in an art collection, etc.). With respect to content viewing, the segment of content used for streamed previewing and the duration of a streamed preview portion are pre-determined by the content owner or the content distributor. In one embodiment, the content previewed is a thirty second audio clip of a musical selection. In an alternative embodiment, the content previewed is a thirty second audio-visual clip of a multimedia content file. Once previewed, the consumer can elect to share the previewed content with third parties. In this case, if a share request has been received, as shown at step 824, the web widget can be further distributed to one or more third party recipients, as shown at step 826. In this manner the content of the artist associated with the web widget can be virally distributed to generate significant buzz or word of mouth marketing in online communities and in channels of prospective consumers whom the artist may have never considered for marketing purposes. Once distributed, the process ends as shown at step 822. If a share request is not received then the web widget will remain in a dormant state and the process will end as shown at step 822.

On the other hand, if after previewing the multimedia content, as shown at step 814, a consumer chooses to initiate a commercial transaction pertaining to the multimedia content, such as a purchase or license of rights pertaining to the content, the web widget will confirm that a purchase or license request has been received, as shown at step 816, and will redirect the consumer to a web page to begin the purchase or license transaction for the selected multimedia content, as shown at step 818. This web page will be coupled to the transaction processing service 112 so that the purchase transaction can be properly completed. In an alternative embodiment, the consumer can specifically pre-designate the vendor operating the multimedia content distribution system 200 as an "approved vendor" with the banks, credit unions and other financial institutions with which it maintains credit cards, debit cards or other financial accounts (e.g., checking accounts, savings accounts, trading accounts, etc.), In this embodiment, the web widget will confirm that a purchase or license request has been received, as shown at step 816, and will automatically execute and complete the purchase or license transaction after receipt of an information signal generated from a single click of a mouse by the consumer on a client device 130, 132, 134 and generate a web page confirming the terms and conditions of the transaction. In an alternative embodiment, the web widget will automatically execute and complete the purchase or license transaction after a receipt of an information signal generated from the pressing of a key on the client device 130, 132, 134 or a gesture on a touchpad provided on the client device 130, 132, 134. All transactions completed through web widgets are tracked in the accounting service 218, data collection will be performed on the types of transactions and the locations of the transactions by the web servers implementing the widget management service 216, and an analysis of statistic trends will be performed and compiled by the analytics and reporting service 210. In one embodiment, the statistical analysis is performed in an autonomous manner. In an alternative embodiment, the analysis of statistical trends is performed upon request by content owners. Once the purchase transaction has been completed, the multimedia content will be downloaded through the web widget to a consumer's client device 130, 132, 134, as shown at step 820, and the process then ends, as shown at step 822. Alternatively, if no purchase request is placed though a web widget, the web widget will remain in an inactivate state with no further processing, as shown at step 822.

Figure 9:
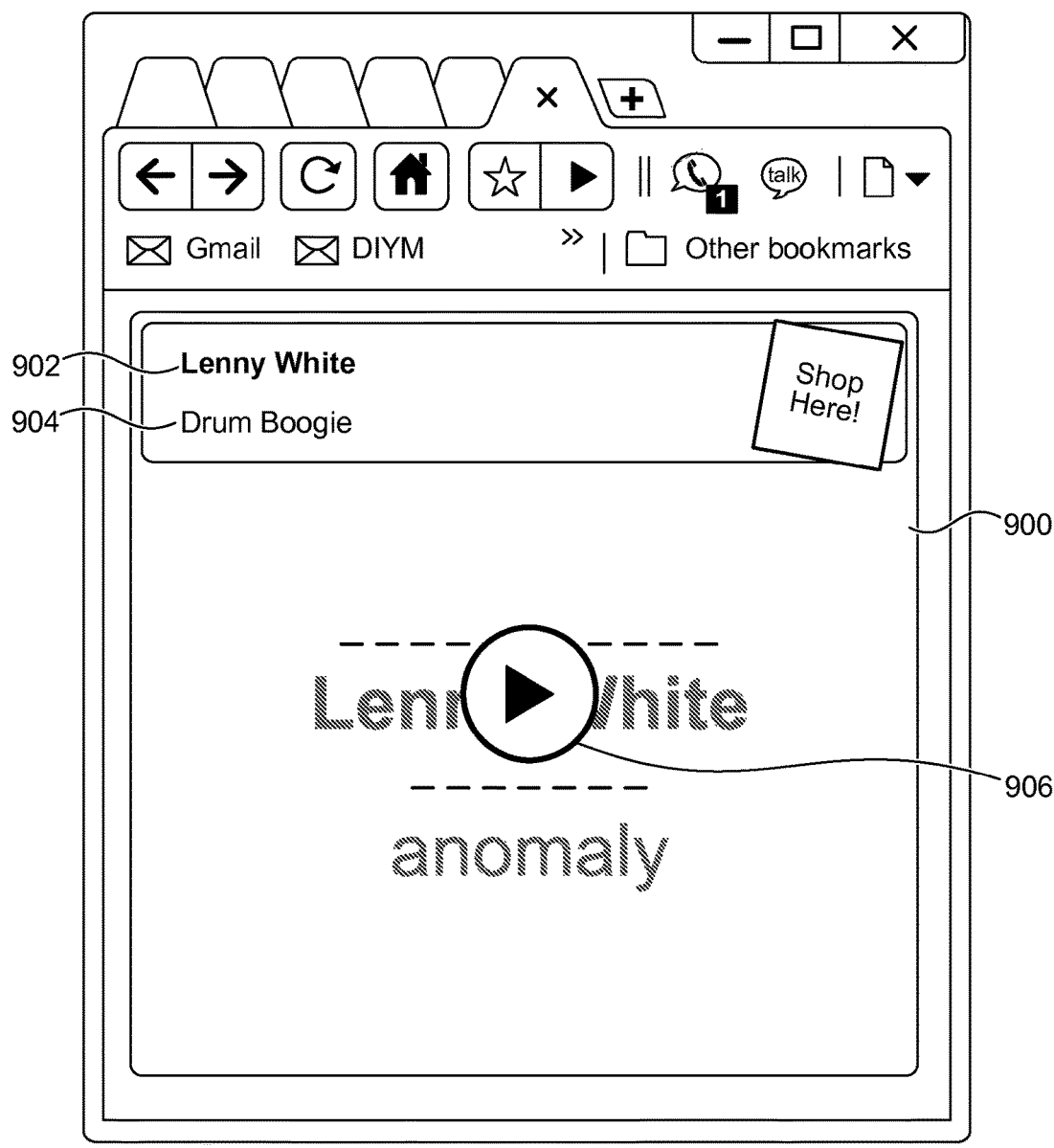
FIG. 9 is a block diagram illustrating a web widget for distribution of multimedia content in an embodiment.

FIG. 9 is an illustration of a web widget in one embodiment. In this embodiment, the web widget 900 is shown in an inactive operational mode and includes an activation button 906 and the web widget 900 identifies the content owner name 902 (i.e., "Lenny White") and the name of the multimedia content file 904 (i.e., "Drum Boogie"). In the illustrated embodiment, clicking on the activation button 906 or on any location within the inactive web widget 900 will cause the retrieval of a multimedia display file and the metadata associated with the multimedia content file from the multimedia content distribution system 200 and start the preview of a pre-determined portion of the multimedia content file associated with the web widget. In an alternative embodiment, clicking on any location within the illustrated web widget 900 in an inactive operational mode will cause the web widget to enter an active operational mode. In one embodiment, the multimedia display file includes artwork or a graphic image which visually represents a cover for the content stored in the multimedia content file associated with the web widget 900. A web widget is received over a network such as the Internet and viewed in a consumer's web browser executing on mobile, laptop or desktop client devices 130, 132, 134 such as Internet Explorer, Firefox, Google Chrome, Safari, Opera or other popular web browsers. The content owner may also elect to create an outer package for a web widget with artistic or illustrative materials as is shown in this embodiment.

Figure 10:
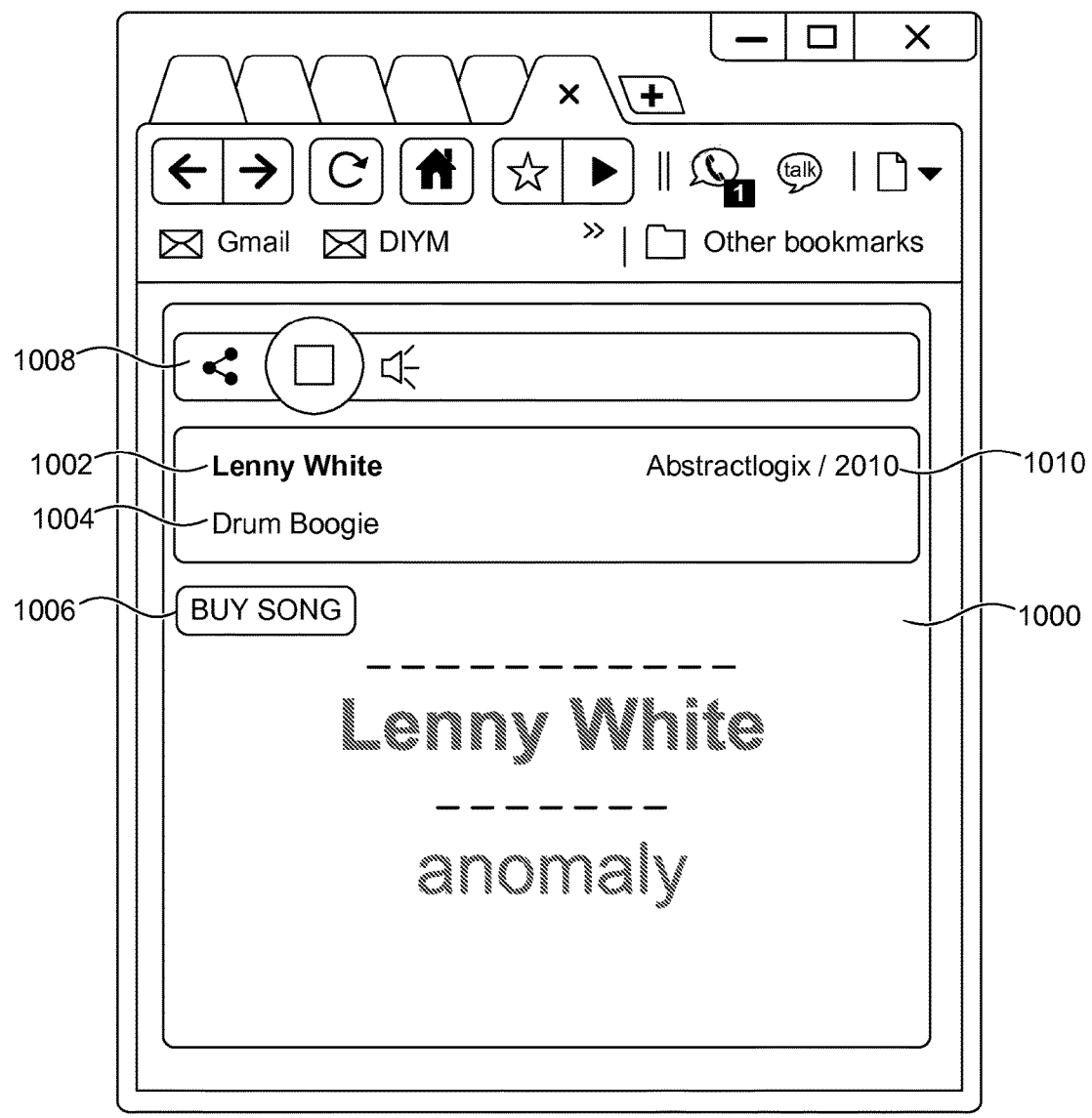
FIG. 10 is a block diagram illustrating an active web widget for distribution of a single musical song in an embodiment.

FIG. 10 is an illustration of a web widget 1000 after a consumer clicks on the activation button 906 or on any location within an inactive web widget to thereby cause the web widget 1000 to enter an active operational mode. In this embodiment, the web widget 1000 includes a field for the content owner's name 1002 (i.e., Lenny White), the name of the musical selection or multimedia content file 1004, a buy button 1006 which will enable the purchase of the multimedia content, which in this embodiment is the musical selection called "Drum Boogie." The web widget 1000 also includes the name of the distributor and the year of distribution 2010 (i.e., Abstractlogix/2010) and provides a field for limited previewing capabilities 1008. As shown in this field 1008, there is a play, pause and end-play button. All functionality provided by the web widget 1000 is performed within the browser on a consumer's client device 130, 132, 134.

In the present embodiment, the web widget 1000 is comprised of a content retrieval component, a content preview component and a transaction processing component. Once the activation button 906 or any location in an inactive web widget is clicked on to thereby cause the web widget 1000 to enter the active operational mode, the content retrieval component will send a request to the widget management service 216 and commence with the retrieval of the multimedia display file and metadata for the multimedia content file which is associated with the web widget 1000 from the cloud-based storage resource 124, the database server 110 or other storage resources which are accessible from the application server 106. Once retrieved, a pre-determined portion of the multimedia content file will be automatically executed by the content preview component to enable the consumer to preview the content prior to making a purchase decision. In executing the pre-determined portion of the selected multimedia content file, the content preview component will enable the multimedia content distribution system to perform a streamed execution of the pre-determined portion in a web browser executing on a client device 130, 132, 134 used by the consumer. The duration and the specific segment of content included in the pre-determined portion of the multimedia content file that is made available for streamed execution on the client device is determined by either the content owner or the content distributor who is responsible for updating the content inventories of content owners having active accounts in the multimedia content distribution system 200 on the application server 106. In one embodiment, the pre-determined portion is a thirty second audio clip of a musical selection. In an alternative embodiment, the pre-determined portion is a thirty second audio-visual clip of a multimedia content file. If the consumer elects to purchase the multimedia content file, in this embodiment the "Buy Song" button will be clicked on which will cause the execution of the transaction processing component. The transaction processing component will initiate, execute and complete a commercial transaction pertaining to the multimedia content file, which in the present embodiment will involve the licensing of the multimedia content file to the consumer. In an alternative embodiment, the commercial transaction is the purchase of rights to the multimedia content files. In both embodiments, however, the consummation of the commercial transaction will redirect a consumer to a third party web page shown within the web widget 1000 where the purchase or license transaction will be completed. In an alternative embodiment, the consumer can specifically pre-designate the vendor that operates the multimedia content distribution system 200 as an "approved vendor" with the banks and other financial institutions with which it maintains credit cards, debit cards or other financial accounts (e.g., checking accounts, savings accounts, trading accounts, etc.). In this embodiment, the web widget 1000 will confirm that a purchase or license request has been received and the web widget 1000 will automatically execute the purchase or license transaction after receipt of an information signal generated from a single click of a mouse by the consumer on a client device 130, 132, 134 and generate a web page confirming the terms and conditions of the transaction. In an alternative embodiment, the web widget 1000 will automatically execute and complete the purchase or license transaction after receipt of an information signal generated from the pressing of a key on the client device 130, 132, 134 or a gesture on a touchpad provided on the client device 130, 132, 134. In each of these embodiments, once the commercial transaction is completed, all portions of the multimedia content file will be downloaded to the consumer client device 130, 132, 134 for full execution on the client device 130, 132, 134 by the consumer.

Figure 11:
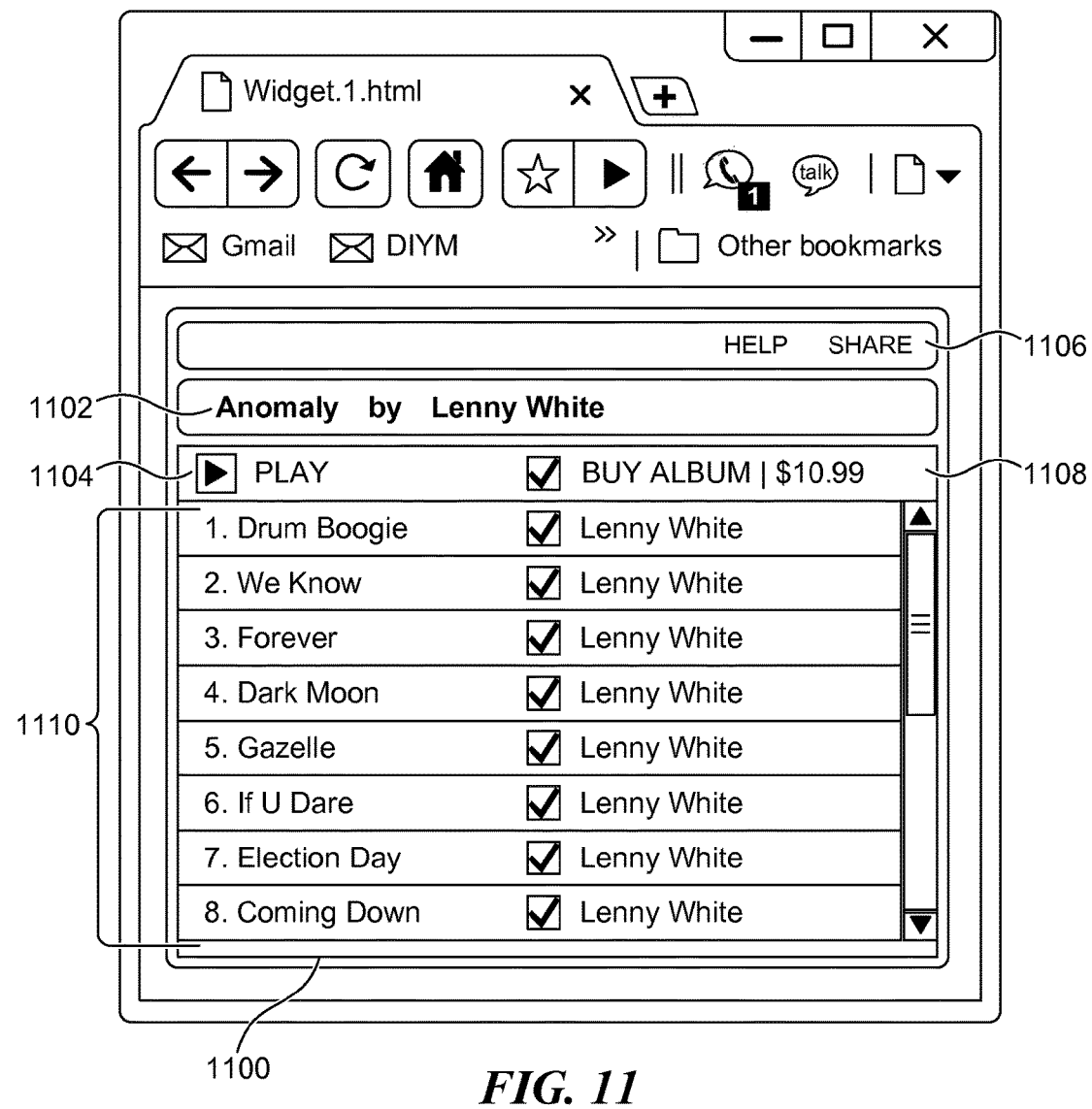
FIG. 11 is a block diagram illustrating an active web widget for distribution of a musical album including a compilation of musical songs in an embodiment.

FIG. 11 illustrates an embodiment of a web widget 1100 in an active operational mode for a release including multiple selections in an embodiment. All of the multimedia content files included in this embodiment of a web widget 1100 are illustrated and listed in region 1110 as an embedded electronic commerce store. Although the illustrated embodiment shows the multimedia content files as musical selections of an album, it should be apparent to those of ordinary skill in the art that the content of this embedded electronic store can include other types of works such as books, paintings, videos, e-books, audio-visual works, software applications, or other content or commercial products created for marketing and sampling purposes in this embedded store. Additional content files can be previewed using the vertical scroll bar shown on the right side of this illustrated web widget 1100. As shown, there are multiple musical selections by an artist named Lenny White included within the web widget 1100. This embodiment of the web widget 1100 also includes a play button 1104, for use in previewing content that has been packaged with the web widget 1100 for promotional purposes. In this embodiment, a consumer can select individual content files (i.e., musical selections) and click on the play button 1104 to preview the selected files, or click on any content file listed in region 1110 to preview only the selected content file. The buy album button 1108 is shown in the same row as the play button 1104 in this embodiment. In addition, the name of the album 1102 (i.e., Anamoly) is shown in the row above the buy button 1104 and buy album 1108 button. As discussed previously, web widgets can be virally distributed and shared with third parties which has the effect of increasing the marketing buzz and name recognition for a content owner. This viral distribution capability is enabled by the share link 1106, as illustrated in this embodiment, and it permits subsequent distribution of the web widget 1100 to other potential consumers in the current users online social networks or other online communities.

In this alternative embodiment, the web widget 1100 is comprised of a content search component, a content retrieval component, a content preview component and a transaction processing component. Once an activation button or any location in an inactive web widget is clicked on, the web widget 1100 will enter an active operational mode. After activation, the consumer is presented with the listing of multimedia content files included in the compilation associated with the active web widget 1100. In this illustrative example, the listing includes the songs provided on the Anamoly album by Lenny White. In reviewing the listing of the content files, a consumer can elect to preview one or more of the content files. If the consumer selects one or more of the listed multimedia content files associated with the web widget 1100 for previewing, the content search component will be activated and configured to search for the selected multimedia content files, which files are accessible from the application server 106. After the application server 106 locates the content files, the content retrieval component will send a retrieval request to the widget management service 216 and the widget management service 216 will generate and send a content download request to the application server 106 based on the received retrieval request. After receipt of the content download request from the widget management service 216, the application server 106 will commence the retrieval of multimedia display files and metadata which are associated with the selected multimedia content files. In one embodiment, the multimedia display files include one or more graphic images of artwork which visually represent each song provided in an album widget (also referred to as a "single release widget" 304). In an alternative embodiment, the multimedia display files include one or more graphic images of the artwork used on the album covers for each album included in a full catalog widget 302. Once the multimedia display files and metadata are retrieved, a pre-determined portion of the selected multimedia content files will be automatically executed by the content preview component to enable the consumer to preview the content files prior to making a purchase decision. In executing the pre-determined portion of the selected multimedia content files, the content preview component will enable the multimedia content distribution system to perform a streamed execution of the pre-determined portion in a web browser executing on a client device 130, 132, 134 used by the consumer in selecting the multimedia content files. The pre-determined portion of each multimedia content file which is made available for streamed execution on a client device is determined by either the content owner or the content distributor who is responsible for updating the content inventories of content owners having active accounts in the multimedia content distribution system 200 on the application server 106. In one embodiment, the pre-determined portion is a thirty second audio clip of a musical selection. In an alternative embodiment, the pre-determined portion is a thirty second audio-visual clip of a multimedia content file. If the consumer elects to purchase or license the compilation of multimedia content files, which in this embodiment is an album containing multiple multimedia content files, the consumer will click on the "Buy Album" button 1108 which will result in the activation of the transaction processing component. In an embodiment, the transaction processing component will initiate, execute and complete a commercial transaction pertaining to the multimedia content files resulting in the payment of fees and, in this example, the licensing of the compilation of multimedia content files to the consumer. Consummation of the commercial transaction occurs after the consumer is redirected to a third party web page which is shown within the web widget 1100 where the purchase or license transaction will be completed. In a different embodiment, the web widget 1100 will automatically execute and complete the purchase or license transaction after receipt of an information signal generated from the pressing of a key on the client device 130, 132, 134 or a gesture on a touchpad provided on the client device 130, 132, 134. Once the commercial transaction is complete, all portions of the content files in the compilation will be downloaded to the consumer client device 130, 132, 134 for full execution on the client device 130, 132, 134 by the consumer.

Figure 12:
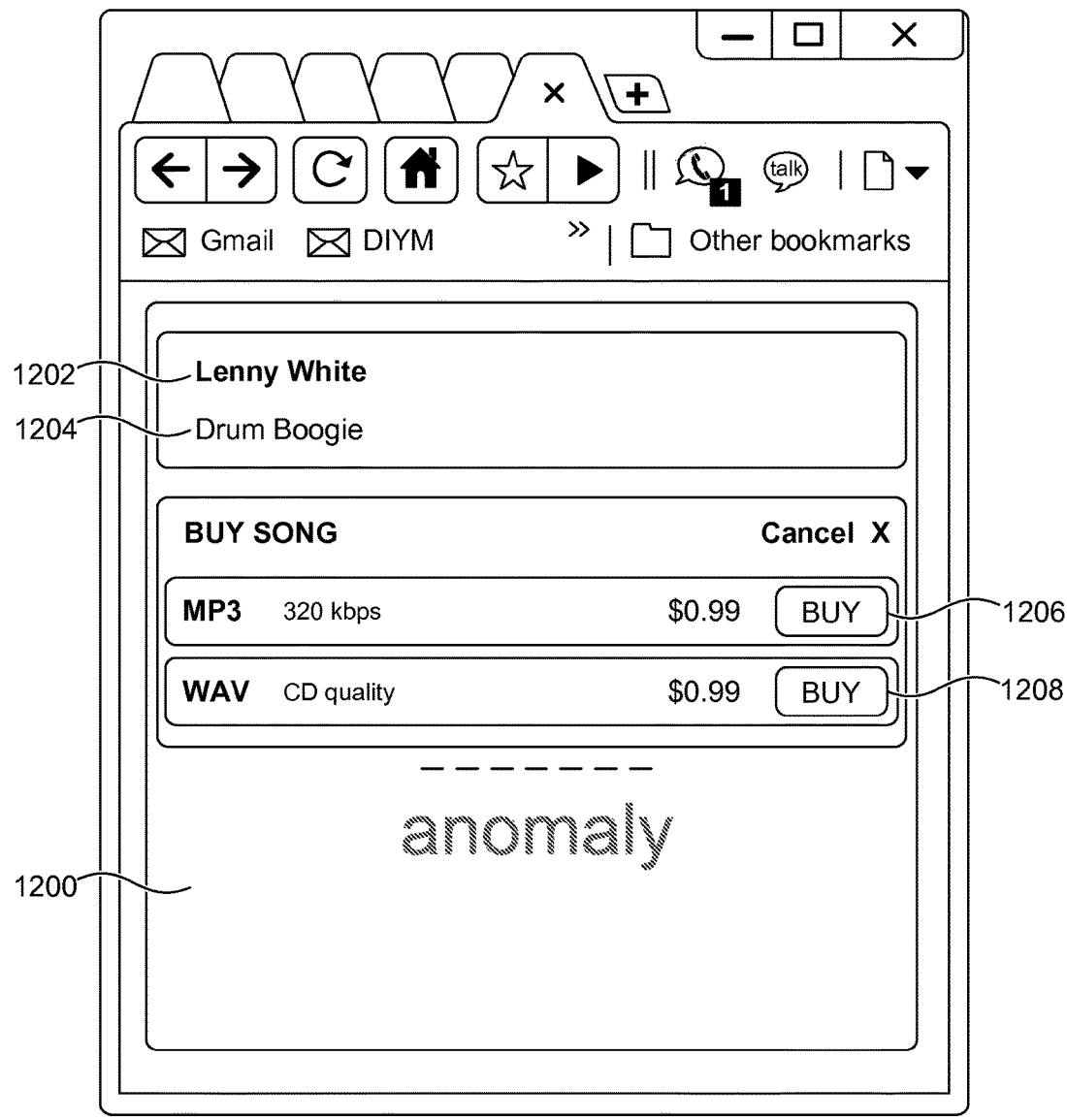
FIG. 12 is a block diagram illustrating an active web widget operative to receive a purchase request in an embodiment.

FIG. 12 is an illustration of a web widget depicting the different format options for content that can be purchased through the web widget 1200. In this embodiment of the web widget 1200, there is an MP3 version of the content file available for $0.99 and a separate buy button 1206. There is also a .WAV format of the content file available for $0.99 and a separate buy button 1208 for that format file. The web widget 1200 also includes the name of the individual song 1204 (i.e., Drum Boogie) and the name of the artist 1202 (i.e., Lenny White).

Figure 13:
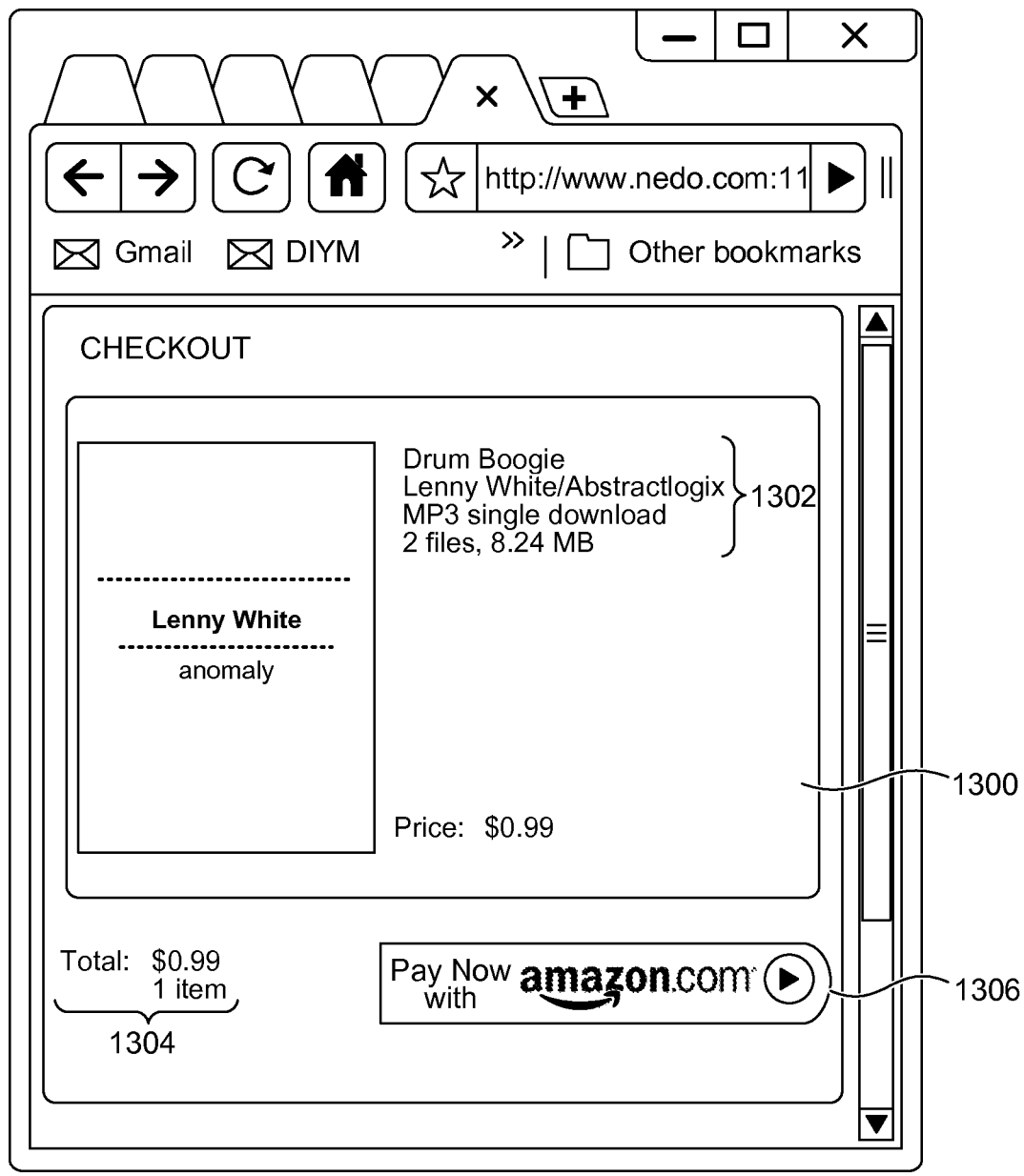
FIG. 13 is a block diagram illustrating a purchase request confirmation in an active web widget in an embodiment.

FIG. 13 is an illustration of the screen shown in a web widget after clicking on a buy button. In this embodiment of a web widget 1300, after a consumer selects the buy button 1206 to purchase the MP3 format file, a checkout screen appears within the web widget 1300 as shown in this figure. The checkout screen of this web widget 1300 includes the total cost of the content file and the number of files purchased, which items are shown in region 1304. The name of the selection (i.e., "Drum Boogie"), the artist name (i.e., Lenny White), the format type (i.e., MP3), the number of files (i.e., 2 files) and the combined file size (i.e., 8.24 MB) are shown in region 1302.

Figure 14:
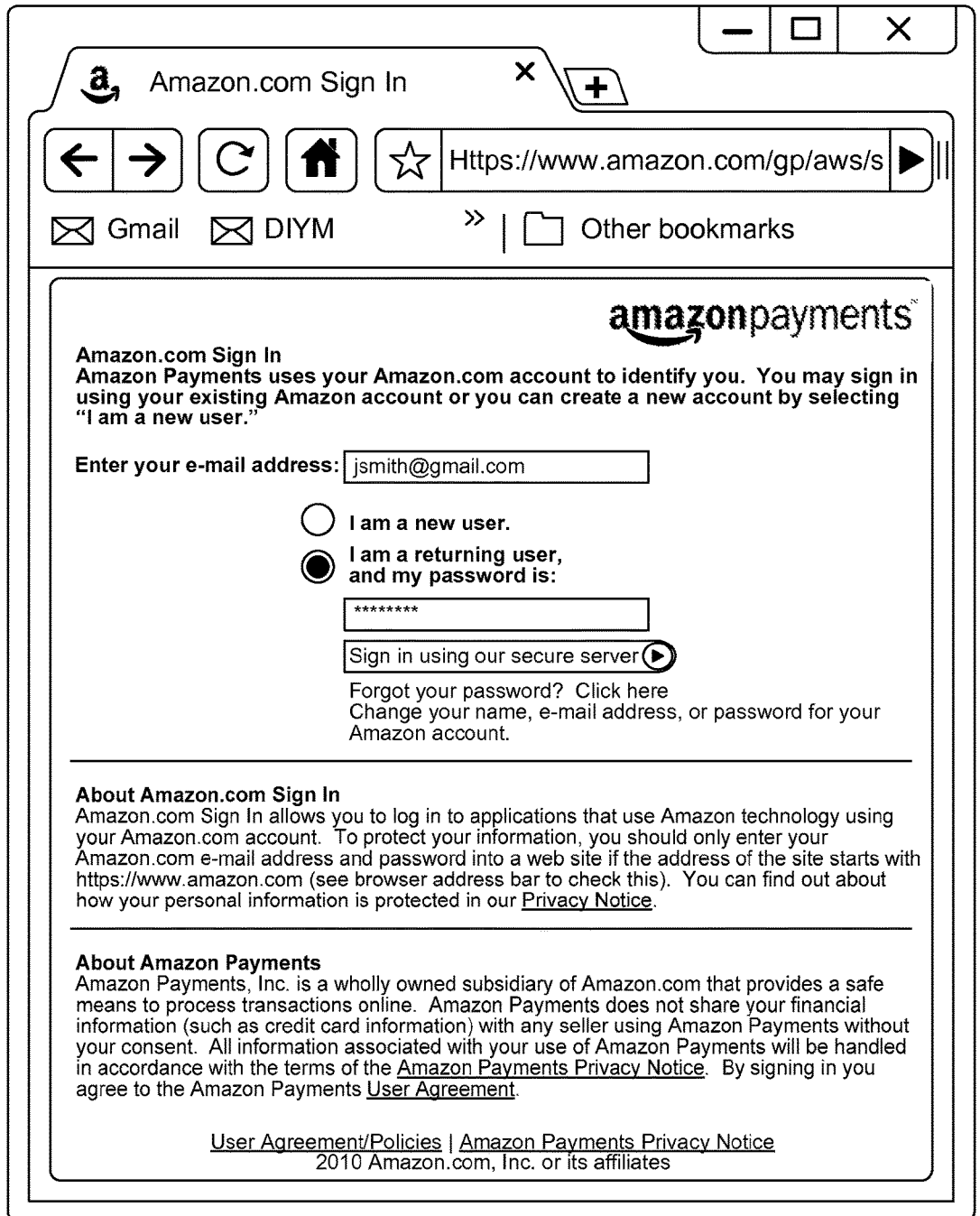
FIG. 14 is a block diagram illustrating user access to a transaction processing service in an active web widget in an embodiment.

FIG. 14 is an illustration of a web page for a transaction processing service 112 in one embodiment. In the illustrated embodiment, the transaction page for the Amazon Flexible Payment Service (i.e., the "Amazon FPS") is shown. In this embodiment, this web page 1400 is the location where the consumer would enter credit card, debit card or bank account information to complete the purchase of the multimedia content file that is stored and available for download from the cloud-based storage resource 124 used in the operating environment with the multimedia content distribution system 200. The Amazon FPS is only one of a number of third party transaction processing services that could be made compatible with the operating environment for the multimedia content distribution system 200. In one alternative embodiment, the alternative transaction processing service can be any one of Authorize.Net, Google Checkout, Storm Pay, PayPal, or other Internet service for transaction processing. In yet another alternative embodiment, the transaction processing service 112 is implemented with a wholly internal, proprietary service that is not generally accessible over the Internet or other public computer communications networks. Each of the foregoing embodiments, however, illustrate how a portable web widget enables commerce through an embedded electronic commerce store regardless of the means used to complete a commercial transaction (i.e., external service such as Authorized.Net, etc. or an internal proprietary service).

Figure 15:
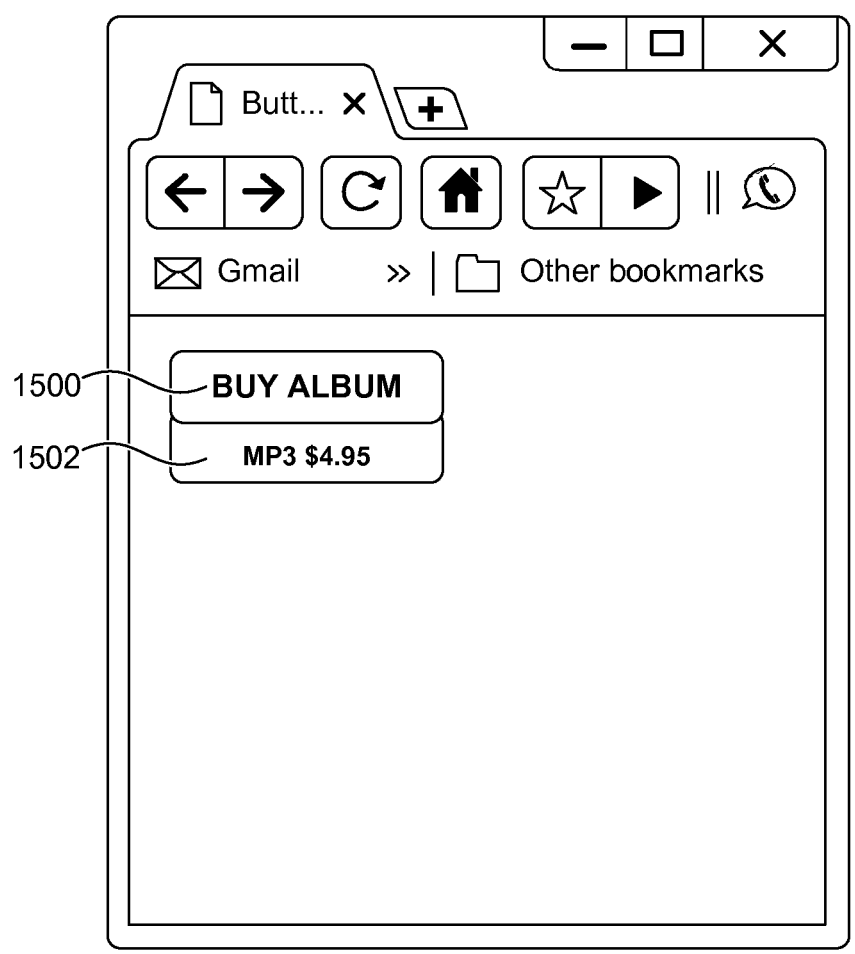
FIG. 15 is a block diagram illustrating a graphical button for viral distribution that provides access to a web widget in an embodiment.

FIG. 15 is an illustration of a buy button 1500 that can be distributed "virally" to consumers and third parties included in their online social networks. The buy button 1500 also identifies the file type (in this example it is an MP3 file type) and the price set by the content owner for the multimedia content file, as shown in field 1502. Upon clicking on the buy button, a web widget will be activated and a checkout screen such as the one illustrated in FIG. 13 in the activated web widget will be displayed in the web browser on the consumer's client device 130, 132, 134.

Although specific embodiments have been illustrated and described herein, it will be appreciated by those of ordinary skill in the art that a wide variety of alternate and/or equivalent implementations may be substituted for the specific embodiments shown and described without departing from the scope of the present disclosure. This application is intended to cover any adaptations or variations of the embodiments discussed herein.

What is claimed is:

1. A method for facilitating electronic commerce within a social network comprising:
   transmitting a web widget from an application server to the social network;
   embedding the web widget into a web page by the social network;
   retrieving a multimedia content from the application server by the social network, wherein the multimedia content is related to an item for purchase from a third-party merchant, and wherein the multimedia content provides a preview of the item available for purchase from the third-party merchant;
   displaying the multimedia content and a hyperlink within the web widget by the social network or by the application server;
   receiving a user selection of the hyperlink by the social network or by the application server; and
   displaying a checkout screen operated and populated only by the third-party merchant, wherein the checkout screen is configured to allow the user to purchase the item using a third-party transaction processing service, wherein the checkout screen is displayed within the web widget.

2. The method of claim 1, wherein the web page is displayed on a client device selected from a group consisting of a laptop computer, a desktop computer, a personal digital assistant, and a smart phone.

3. The method of claim 1, wherein the multimedia content is selected from a group consisting of an image file, a video file, and an audio file.

4. The method of claim 1, wherein the web widget includes a share button configured to share the multimedia content via the social network upon the share button being selected by the user.

5. The method of claim 1, wherein the checkout screen is displayed within the web widget while the web page is visible to the user on a browser.

6. The method of claim 1, further comprising retrieving an identifier for the item from the application server by the social network, wherein the identifier is selected from a group consisting of a Universal Product Code (IPC), a price, a name, and a description.

7. The method of claim 1, wherein the item is selected from a group consisting of an e-book, a video, an audio-visual work, a musical selection, a video game file, a software application, electronic goods, and physical merchandise.

8. A method for facilitating electronic commerce within a social network comprising:
   transmitting a web widget from an application server to the social network;
   embedding the web widget into a web page by the social network;
   retrieving a multimedia content from the application server by the social network, wherein the multimedia content is related to an item for purchase from a third-party merchant;
   displaying the multimedia content and a hyperlink within the web widget by the social network;
   receiving a user selection of the hyperlink by the social network or by the application server; and
   displaying a checkout screen operated and populated only by the third-party merchant, wherein the checkout screen is configured to allow the user to purchase the item using a third-party transaction processing service, wherein the checkout screen is displayed within the web widget without re-directing the user away from the web page.

9. The method of claim 8, wherein the web page is displayed on a client device selected from a group consisting of a laptop computer, a desktop computer, a personal digital assistant, and a smart phone.

10. The method of claim 8, wherein the multimedia content is selected from a group consisting of an image file, a video file, and an audio file.

11. The method of claim 8, wherein the web widget includes a share button configured to share the multimedia content via the social network upon the share button being selected by the user.

12. The method of claim 8, wherein the checkout screen is displayed within the web widget while the web page is visible to the user.

13. The method of claim 8, wherein the item is selected from a group consisting of an e-book, a video, an audio-visual work, a musical selection, a video game file, a software application, electronic goods, and physical merchandise.

* * * * *